(12) United States Patent
Namii

(10) Patent No.: US 12,484,763 B2
(45) Date of Patent: Dec. 2, 2025

(54) OBJECTIVE OPTICAL SYSTEM, IMAGE PICKUP APPARATUS, AND ENDOSCOPE

(71) Applicant: OLYMPUS CORPORATION, Hachioji (JP)

(72) Inventor: Yasushi Namii, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 373 days.

(21) Appl. No.: 18/171,740

(22) Filed: Feb. 21, 2023

(65) Prior Publication Data

US 2023/0200627 A1 Jun. 29, 2023

Related U.S. Application Data

(63) Continuation of application No. PCT/JP2020/034695, filed on Sep. 14, 2020.

(51) Int. Cl.
*A61B 1/00* (2006.01)
*A61B 1/04* (2006.01)

(52) U.S. Cl.
CPC .......... *A61B 1/00096* (2013.01); *A61B 1/046* (2022.02)

(58) Field of Classification Search
CPC ..... A61B 1/00096; A61B 1/046; A61B 1/043; G02B 3/10; G02B 13/146; G02B 13/14; G02B 13/18; G02B 23/243
See application file for complete search history.

(56) References Cited

U.S. PATENT DOCUMENTS 4,172,227 A * 10/1979 Tyrer ................. G01N 15/1429
356/417
5,835,279 A * 11/1998 Marshall .............. G02B 25/001
359/716
(Continued)

FOREIGN PATENT DOCUMENTS

| JP | 2003098426 A | 4/2003 |
|----|--------------|--------|
| JP | 2006235139 A | 9/2006 |
| JP | 5315574 B2 | 7/2013 |

OTHER PUBLICATIONS

International Preliminary Report on Patentability (IPRP) (and English language translation thereof) dated Mar. 7, 2023, issued in counterpart International Application No. PCT/JP2020/034695.
(Continued)

*Primary Examiner* — Anh Tuan T Nguyen
*Assistant Examiner* — Shankar Raj Ghimire
(74) *Attorney, Agent, or Firm* — Holtz, Holtz & Volek PC

(57) ABSTRACT

An objective optical system includes a predetermined lens disposed near the pupil of the objective optical system. The predetermined lens has a first refractive region including an optical axis and a second refractive region located outside the first refractive region. The refractive power of the second refractive region is greater than the refractive power of the first refractive region. A light beam reaching an image plane includes a first light beam and a second light beam. The first light beam is a light beam transmitted through the first refractive region and includes at least one of a beam of white light and a beam of near-infrared light. The second light beam is a light beam transmitted through the second refractive region and includes only the beam of near-infrared light. A predetermined conditional expression (1) is satisfied.

5 Claims, 15 Drawing Sheets

(56) References Cited

U.S. PATENT DOCUMENTS

| | | | | |
|---|---|---|---|---|
| 6,118,594 | A * | 9/2000 | Maruyama | G11B 7/1353 |
| 6,678,096 | B2 * | 1/2004 | Sugi | G11B 7/13922 |
| | | | | 359/719 |
| 6,687,209 | B2 * | 2/2004 | Ota | G11B 7/13922 |
| | | | | 369/112.25 |
| 6,728,172 | B2 * | 4/2004 | Ikenaka | G11B 7/1353 |
| 7,579,577 | B2 | 8/2009 | Ono | |
| 10,054,772 | B1 * | 8/2018 | Zobel | G02B 13/0095 |
| 10,095,086 | B2 | 10/2018 | Lee | |
| 10,152,631 | B2 | 12/2018 | Dainty et al. | |
| 12,276,779 | B2 * | 4/2025 | Wei | G02B 13/06 |
| 2002/0013513 | A1 * | 1/2002 | Bala | A61B 1/042 |
| | | | | 600/178 |
| 2003/0050532 | A1 * | 3/2003 | Doguchi | A61B 1/043 |
| | | | | 348/E5.029 |
| 2005/0007935 | A1 * | 1/2005 | Sugi | G11B 7/1374 |
| 2008/0308712 | A1 * | 12/2008 | Ono | H04N 23/84 |
| | | | | 250/208.1 |
| 2016/0044253 | A1 | 2/2016 | Dainty et al. | |
| 2016/0092731 | A1 | 3/2016 | Dainty et al. | |
| 2016/0143517 | A1 * | 5/2016 | Vance | A61B 1/00188 |
| | | | | 600/177 |
| 2016/0313629 | A1 | 10/2016 | Lee | |
| 2017/0293118 | A1 * | 10/2017 | Huang | G02B 7/023 |
| 2018/0372996 | A1 * | 12/2018 | Bone | G02B 13/18 |
| 2020/0018947 | A1 * | 1/2020 | Tsuyuki | A61B 1/00006 |
| 2021/0244344 | A1 * | 8/2021 | Aarts | G16H 50/20 |
| 2023/0168474 | A1 * | 6/2023 | Peters | G02B 13/14 |
| | | | | 348/164 |
| 2023/0200627 | A1 * | 6/2023 | Namii | G02B 23/243 |
| | | | | 600/109 |

OTHER PUBLICATIONS

International Search Report (ISR) (and English language translation thereof) dated Dec. 1, 2020, issued in International Application No. PCT/JP2020/034695.

Written Opinion dated Dec. 1, 2020, issued in International Application No. PCT/JP2020/034695.

* cited by examiner

OBJECTIVE OPTICAL SYSTEM, IMAGE PICKUP APPARATUS, AND ENDOSCOPE

CROSS-REFERENCE TO RELATED APPLICATION

The present application is a continuation application of PCT/JP2020/034695 filed on Sep. 14, 2020; the entire contents of which are incorporated herein by reference.

BACKGROUND

Technical Field

The present disclosure relates to an objective optical system, an image pickup apparatus, and an endoscope.

Description of the Related Art

Normal light observation and special light observation are known as observation in an endoscope. Furthermore, narrow-band light observation, fluorescence observation, and infrared light observation are known as special light observation.

In normal light observation, white light is used as illumination light. The wavelength range of white light is shorter than the wavelength range of infrared light. The wavelength range of white light includes the wavelength range of visible light. The wavelength range of visible light is, for example, 400 nm to 760 nm.

White light is used for, for example, observation of the surface of mucosa. When the mucosa is irradiated with white light, reflection of white light occurs on the surface of the mucosa. By detecting the reflected light, it is possible to observe the surface of the mucosa.

White light does not reach the depth of the mucosa. Therefore, it is difficult to observe blood vessels with white light when the blood vessels are located in the depth of the mucosa.

In infrared light observation, infrared light is used as illumination light. Infrared light reaches the depth of the mucosa. Therefore, even when blood vessels are located in the depth of the mucosa, it is possible to observe the blood vessels by illuminating the blood vessels and detecting the reflected light.

Infrared light is classified into near-infrared light, mid-infrared light, and far-infrared light. The wavelength range of near-infrared light is variously defined, for example, as follows.

770 nm to 1400 nm
780 nm to 2000 nm
790 nm to 2000 nm

In observation of blood vessels, it is possible to use indocyanine green (hereinafter referred to as "ICG"). In ICG, light absorption and light emission are performed.

The peak wavelength of absorbed light is 805 nm. The peak wavelength of emitted light is 835 nm. Hereafter, the absorbed light is referred to as excitation light and the emitted light is referred to as fluorescence.

The wavelength range of excitation light and the wavelength range of fluorescence are included in the wavelength range of near-infrared light. Thus, near-infrared light is used in observation using ICG.

As described above, infrared light reaches the depth of the mucosa. Near-infrared light is included in infrared light. Thus, it is possible to illuminate blood vessels with near-infrared light.

In a case where ICG is contained in blood, fluorescence is emitted from the inside of the blood vessel when the blood vessel is irradiated with near-infrared light. Thus, it is possible to detect fluorescence even when the blood vessel is located in the depth of the mucosa.

Near-infrared light is also used in a case where ICG is not contained in blood. When the blood vessel is irradiated with near-infrared light, reflection of near-infrared light occurs on the surface of the blood vessel. Thus, it is possible to detect the reflected light even when the blood vessel is located in the depth of the mucosa.

With near-infrared light, it is possible to observe the blood vessel with reflected light and fluorescence even when the blood vessel is located in the depth of the mucosa.

In normal light observation, an optical image formed by white light (hereinafter referred to as "white light image") is used. In infrared light observation, an optical image formed by near-infrared light (hereinafter referred to as "near-infrared light image") is used.

When normal light observation and infrared light observation are performed with a single optical system, it is preferable that the position of a white light image coincides with the position of an infrared light image. If the two optical images differ in position, it is impossible to acquire an image in focus in both of normal light observation and infrared light observation.

An image pickup apparatus capable of acquiring two images in focus is disclosed in Japanese Patent No. 5315574. In this image pickup apparatus, a stop is disposed in an optical system. The stop has a light passing section and a filter. The filter is disposed on a periphery of the light passing section. Three examples are disclosed for the light passing section and the filter.

In a first example of the image pickup apparatus, a second wavelength range is a range including wavelengths longer than the wavelengths in a first wavelength range. The light passing section allows both light in the first wavelength range and light in the second wavelength range to pass through. The filter transmits light in the first wavelength range but does not transmit light in the second wavelength range.

Specifically, the first wavelength range is a visible light range and the second wavelength range is an infrared light range. In this case, the light passing section allows visible light and infrared light to pass through. The filter transmits visible light but does not transmit infrared light.

In a second example of the image pickup apparatus, the first wavelength range is a range including wavelengths longer than the wavelengths in the second wavelength range. The light passing section allows both light in the first wavelength range and light in the second wavelength range to pass through. The filter transmits light in the second wavelength range but does not transmit light in the first wavelength range.

Specifically, light in the first wavelength range is infrared light and light in the second wavelength range is visible light. In this case, the light passing section allows white light and near-infrared light to pass through. The filter transmits visible light but does not transmit infrared light.

In a third example of the image pickup apparatus, the filter transmits at least one component of R component light, B component light, G component light, and infrared light, and does not transmit the other components.

Specifically, the filter transmits R component light, B component light, and infrared light, and does not transmit G component light. The light passing section allows R component light, B component light, G component light, and infrared light to pass through.

In the first example of the image pickup apparatus and the second example of the image pickup apparatus, infrared light is not transmitted through the filter. Therefore, the depth of field in infrared light is wider than when infrared light is transmitted through the filter. As a result, there is a region where the depth of field in visible light and the depth of field in infrared light overlap. By placing an imager in this region, it is possible to acquire a visible light image and an infrared light image simultaneously.

In the third example of the image pickup apparatus, G component light is not transmitted through the filter. Therefore, the depth of field in G component light is wider than when G component light is transmitted through the filter. As a result, there is a region where the depth of field in G component light and the depth of field in infrared light overlap. By placing an imager in this region, it is possible to acquire a visible light image and an infrared light image simultaneously.

SUMMARY

An objective optical system according to at least some embodiments of the present disclosure includes a predetermined lens disposed near a pupil of the objective optical system, wherein
  the predetermined lens has a first refractive region including an optical axis and a second refractive region located outside the first refractive region,
  a refractive power of the second refractive region is greater than a refractive power of the first refractive region,
  a light beam reaching an image plane includes a first light beam and a second light beam,
  the first light beam is a light beam transmitted through the first refractive region and includes at least one of a beam of white light and a beam of near-infrared light,
  the second light beam is a light beam transmitted through the second refractive region and includes only the beam of near-infrared light, and
  the following Conditional Expression (1) is satisfied:

$$0 < \{(Dir/Dw)^2 \times (Tir/Dir)\} / \{(fir-fe)/(Pich \times Fno)\} < 0.1 \qquad (1)$$

where Dir is an aperture diameter that allows the near-infrared light to pass through,
  Dw is an aperture diameter that allows the white light to pass through,
  Tir is a spherical segment amount in the second refractive region,
  fir is a focal length of the objective optical system at a predetermined wavelength,
  fe is a focal length of the objective optical system at e-line,
  Fno is an F-number of the objective optical system at e-line,
  Pich is a pixel pitch of an imager, wherein
  the spherical segment amount is a maximum distance among distances between a virtual plane and the second refractive region,
  the virtual plane is a plane passing through a boundary between the first refractive region and the second refractive region and being orthogonal to the optical axis,
  the distance is a distance in a direction parallel to the optical axis, and
  the predetermined wavelength is 835 nm.

An image pickup apparatus according to at least some embodiments of the present disclosure includes a predetermined lens disposed near a pupil of an objective optical system, wherein
  the predetermined lens has a first refractive region including an optical axis and a second refractive region located outside the first refractive region,
  a refractive power of the second refractive region is greater than a refractive power of the first refractive region,
  a light beam reaching an image plane includes a first light beam and a second light beam,
  the first light beam is a light beam transmitted through the first refractive region and includes at least one or both of a beam of white light and a beam of near-infrared light,
  the second light beam is a light beam transmitted through the second refractive region and includes only the beam of near-infrared light, and
  the following Conditional Expression (1) is satisfied:

$$0 < \{(Dir/Dw)^2 \times (Tir/Dir)\} / \{(fir-fe)/(Pich \times Fno)\} < 0.1 \qquad (1)$$

where Dir is an aperture diameter that allows the near-infrared light to pass through,
  Dw is an aperture diameter that allows the white light to pass through,
  Tir is a spherical segment amount in the second refractive region,
  fir is a focal length of the objective optical system at a predetermined wavelength,
  fe is a focal length of the objective optical system at e-line,
  Fno is an F-number of the objective optical system at e-line,
  Pich is a pixel pitch of an imager, wherein
  the spherical segment amount is a maximum distance among distances between a virtual plane and the second refractive region,
  the virtual plane is a plane passing through a boundary between the first refractive region and the second refractive region and being orthogonal to the optical axis,
  the distance is a distance in a direction parallel to the optical axis, and
  the predetermined wavelength is 835 nm.

An endoscope according to at least some embodiments of the present disclosure includes a predetermined lens disposed near a pupil of an objective optical system, wherein
  the predetermined lens has a first refractive region including an optical axis and a second refractive region located outside the first refractive region,
  a refractive power of the second refractive region is greater than a refractive power of the first refractive region,
  a light beam reaching an image plane includes a first light beam and a second light beam,
  the first light beam is a light beam transmitted through the first refractive region and includes at least one of a beam of white light and a beam of near-infrared light,
  the second light beam is a light beam transmitted through the second refractive region and includes only the beam of near-infrared light, and
  the following Conditional Expression (1) is satisfied:

$$0 < \{(Dir/Dw)^2 \times (Tir/Dir)\} / \{(fir-fe)/(Pich \times Fno)\} < 0.1 \qquad (1)$$

where Dir is an aperture diameter that allows the near-infrared light to pass through, Dw is an aperture diameter that allows the white light to pass through, Tir is a spherical segment amount in the second refractive region, fir is a focal length of the objective optical system at a predetermined wavelength, fe is a focal length of the objective optical system at e-line, Fno is an F-number of the objective optical system at e-line, Pich is a pixel pitch of an imager, wherein the spherical segment amount is a maximum distance among distances between a virtual plane and the second refractive region, the virtual plane is a plane passing through a boundary between the first refractive region and the second refractive region and being orthogonal to the optical axis, the distance is a distance in a direction parallel to the optical axis, and the predetermined wavelength is 835 nm.

DETAILED DESCRIPTION

For an objective optical system of the present embodiment, an image pickup apparatus of the present embodiment, and an endoscope of the present embodiment, the reason and action of these configurations will be described below. The present disclosure is not limited by these embodiments.

An objective optical system of the present embodiment includes a predetermined lens disposed near a pupil of the objective optical system. The predetermined lens has a first refractive region including an optical axis and a second refractive region located outside the first refractive region. A refractive power of the second refractive region is greater than a refractive power of the first refractive region. A light beam reaching an image plane includes a first light beam and a second light beam. The first light beam is a light beam transmitted through the first refractive region and includes at least one of a beam of white light and a beam of near-infrared light. The second light beam is a light beam transmitted through the second refractive region and includes only the beam of near-infrared light.

Figure 1A:
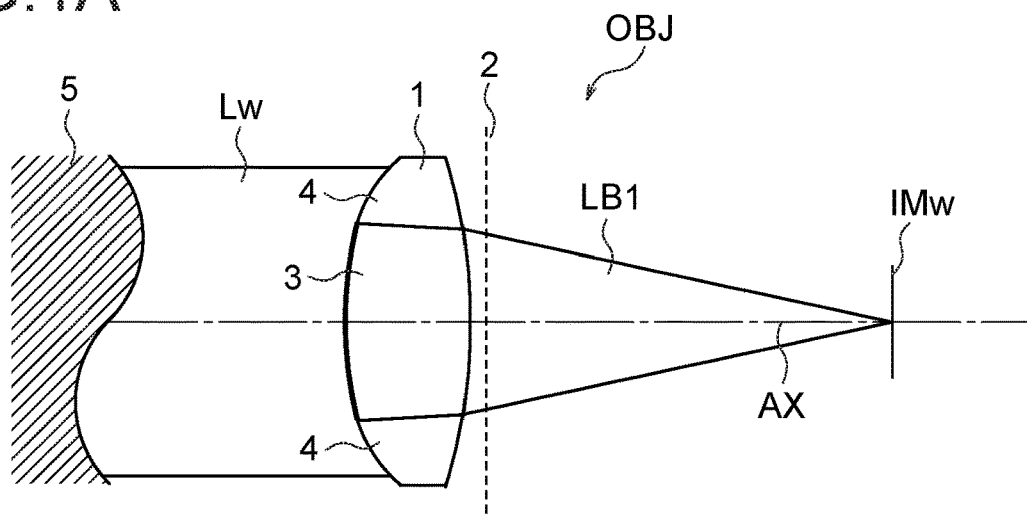
FIG. 1A, FIG. 1B and FIG. 1C are diagrams illustrating a light beam reaching an image plane from an objective optical system of the present embodiment.
Figure 1B:
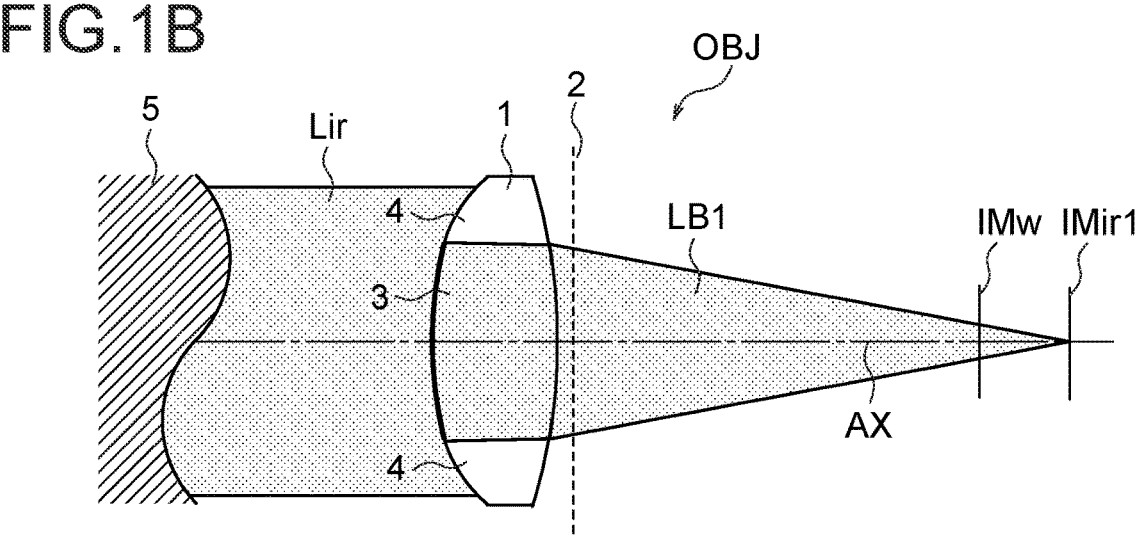
Figure 1C:
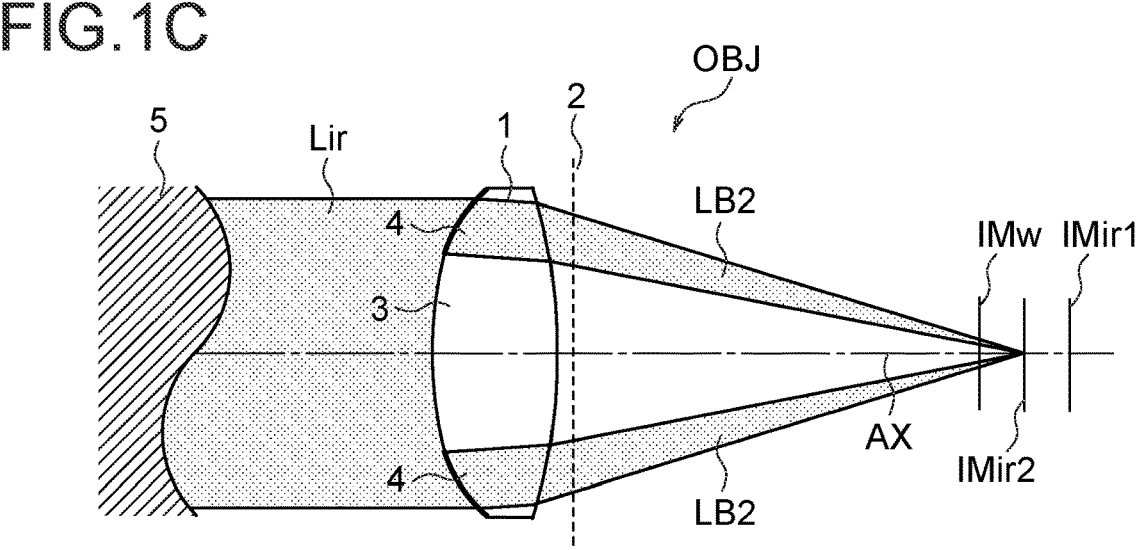

The objective optical system of the present embodiment will be described. FIG. 1A to FIG. 1C are diagrams illustrating a light beam reaching an image plane from the objective optical system of the present embodiment. FIG. 1A is a diagram illustrating a case where the first light beam is white light. FIG. 1B is a diagram illustrating a case where the first light beam is near-infrared light. FIG. 1C is a diagram illustrating a case where the second light beam is near-infrared light.

As illustrated in FIG. 1A, an objective optical system OBJ includes a predetermined lens 1. The predetermined lens 1 is disposed near a pupil 2. The pupil 2 is the pupil of the objective optical system OBJ.

The predetermined lens 1 has a first refractive region 3 and a second refractive region 4. The first refractive region 3 includes an optical axis AX. The second refractive region 4 is located outside the first refractive region 3. When the shape in a cross section perpendicular to the optical axis is "cross-sectional shape", the cross-sectional shape of the first refractive region 3 is circular. The cross-sectional shape of the second refractive region 4 is annular.

The refractive power of the second refractive region 4 is greater than the refractive power of the first refractive region 3.

An object 5 is illuminated by a not-illustrated illumination optical system. In illumination, it is possible to separately use white light and near-infrared light. In this case, two kinds of optical images are separately formed on the image plane of the objective optical system OBJ. One of the optical images is a white light image and the other optical image is a near-infrared light image.

Furthermore, in illumination, it is possible to simultaneously use white light and near-infrared light. In this case, two kinds of optical images are simultaneously formed on the image plane of the objective optical system OBJ.

The two kinds of optical images are formed by a light beam reaching the image plane. The light beam reaching the image plane includes a first light beam and a second light beam.

The first light beam is a light beam transmitted through the first refractive region. The first light beam includes one of a beam of white light and a beam of near-infrared light, or both of a beam of white light and a beam of near-infrared light. The second light beam is a light beam transmitted through the second refractive region. The second light beam includes only the beam of near-infrared light.

The first light beam and the second light beam will be described with reference to FIG. 1A, FIG. 1B, and FIG. 1C.

When the object 5 is irradiated with white light, as illustrated in FIG. 1A, white light Lw is incident on the objective optical system OBJ.

The predetermined lens 1 has the first refractive region 3 and the second refractive region 4. The white light Lw is incident on the first refractive region 3 and the second refractive region 4.

In the first refractive region 3, white light is transmitted. In the second refractive region 4, white light is not transmitted. Therefore, a light beam LB1 transmitted through the first refractive region 3 is emitted from the objective optical system OBJ.

The light beam LB1 reaches the image plane. As a result, an optical image IMw is formed on the image plane of the objective optical system OBJ. The light beam LB1 is a beam of white light. Thus, the optical image IMw is a white light image.

When the object 5 is irradiated with near-infrared light, as illustrated in FIG. 1B and FIG. 1C, near-infrared light Lir is incident on the objective optical system OBJ.

In the first refractive region 3 and the second refractive region 4, near-infrared light is transmitted. Therefore, a light beam LB1 transmitted through the first refractive region 3 and a light beam LB2 transmitted through the second refractive region 4 are emitted from the objective optical system OBJ.

The light beam LB1 and the light beam LB2 reach the image plane. As a result, an optical image IMir1 and an optical image IMir2 are formed on the image plane of the objective optical system OBJ. The light beam LB1 and the light beam LB2 are beams of near-infrared light. Thus, the optical image IMir1 and the optical image IMir2 are near-infrared light images.

As described above, the white light image and the near-infrared light image differ in light beam used in formation of an optical image. When an optical image formed by the objective optical system OBJ is a white light image, only the light beam LB1 is used. When an optical image formed by the objective optical system OBJ is a near-infrared light image, the light beam LB1 and the light beam LB2 are used.

As illustrated in FIG. 1A and FIG. 1B, the light beam LB1 is a light beam reaching the image plane and transmitted through the first refractive region 3.

Furthermore, when the object 5 is illuminated with white light, the light beam LB1 includes a beam of white light. When the object 5 is illuminated with near-infrared light, the light beam LB1 includes a beam of near-infrared light. When the object 5 is illuminated with white light and near-infrared light, the light beam LB1 includes a beam of white light and a beam of near-infrared light. Thus, the light beam LB1 represents the first light beam.

As illustrated in FIG. 1C, the light beam LB2 is a light beam reaching the image plane and transmitted through the second refractive region 4.

Furthermore, when the object 5 is illuminated with white light, the light beam LB2 is not produced. When the object 5 is illuminated with near-infrared light, the light beam LB2 includes a beam of near-infrared light. When the object 5 is illuminated with white light and near-infrared light, the light beam LB2 includes only the beam of near-infrared light. Thus, the light beam LB2 represents the second light beam.

As described above, the first light beam (light beam LB1) includes a beam of white light and a beam of near-infrared light. The second light beam (light beam LB2) includes only the beam of near-infrared light. A method of generating the first light beam and the second light beam will be described later.

The optical image formed by the objective optical system OBJ includes a near-infrared light image and a white light image. The near-infrared light image includes the optical image IMir1 formed by the first light beam and the optical image IMir2 formed by the second light beam. Thus, it is possible to ensure sufficient brightness in the near-infrared light image.

The white light image includes only the optical image IMw formed by the first light beam. The white light includes R component light, B component light, and G component light in certain proportions. In the optical image IMw, the proportion of each component light does not change from when white light is incident on the objective optical system OBJ to when it reaches the image plane. Thus, it is possible to ensure high color reproducibility in the white light image.

As described above, the near-infrared light image includes the optical image IMir1 and the optical image IMir2. As illustrated in FIG. 1C, the position of the optical image IMir2 is closer to the optical image IMw than the position of the optical image IMir1. Thus, it is possible to bring the position of the near-infrared light image closer to the position of the white light image. As a result, it is possible to reduce the displacement between the position of the near-infrared light image and the position of the white light image.

In the objective optical system of the present embodiment, it is preferable that the following Conditional Expression (1) is satisfied:

$$0 < \{(Dir/Dw)^2 \times (Tir/Dir)\} / \{(fir-fe)/(Pich \times Fno)\} < 0.1 \qquad (1)$$

where Dir is an aperture diameter that allows near-infrared light to pass through, Dw is an aperture diameter that allows white light to pass through, Tir is a spherical segment amount in the second refractive region, fir is a focal length of the objective optical system at a predetermined wavelength, fe is a focal length of the objective optical system at e-line, Fno is an F-number of the objective optical system at e-line, Pich is a pixel pitch of an imager, the spherical segment amount is the maximum distance among distances between a virtual plane and the second refractive region, the virtual plane is a plane passing through a boundary between the first refractive region and the second refractive region and being orthogonal to the optical axis, the distance is a distance in a direction parallel to the optical axis, and the predetermined wavelength is 835 nm. As used herein, the term "e-line" refers to the Fraunhofer e-line having a wavelength of 546.07 nm, and the term "F-number" refers to a value obtained by dividing the focal length of the objective optical system at e-line and an effective aperture diameter.

The displacement between the position of the near-infrared light image and the position of the white light image is a displacement between the focus position in the near-infrared light and the focus position in the white light (hereinafter referred to as "displacement in focus position"). To reduce the displacement between the position of the near-infrared light image and the position of the white light image, it is only necessary to reduce the displacement in focus position.

The displacement in focus position is caused by chromatic aberration. Thus, if chromatic aberration can be corrected favorably, it is possible to eliminate the displacement in focus position. When the wavelength range to be corrected is narrow, favorable correction of chromatic aberration is easy. By comparison, when the wavelength range to be corrected is wide, favorable correction of chromatic aberration is not easy. Moreover, even if chromatic aberration can be corrected, the optical system is larger.

In the objective optical system of the present embodiment, light ranging from white light to near-infrared light is used. Therefore, the wavelength range to be corrected is extremely wide. As described above, it is very difficult to correct chromatic aberration favorably when the wavelength range to be corrected is wide. Thus, occurrence of displacement in focus position is allowed in the objective optical system of the present embodiment.

When occurrence of displacement in focus position is allowed, the displacement in focus position must be reduced by a method other than correction of chromatic aberration. To reduce the displacement in focus position, it is only necessary to change one of the focus position in near-infrared light and the focus position in white light, or both of the focus position in near-infrared light and the focus position in white light.

As described above, in the objective optical system of the present embodiment, it is possible to bring the position of the near-infrared light image closer to the position of the white light image. In other words, it is possible to bring the focus position in near-infrared light closer to the focus position in white light. Thus, it is possible to reduce the displacement in focus position.

As described above, in the objective optical system of the present embodiment, occurrence of displacement in focus position is allowed, and the focus position in near-infrared light is shifted to reduce the displacement in focus position. To reduce the displacement in focus position, it is important to set the amount of displacement in focus position and the amount of shifting of the focus position in near-infrared light as appropriate.

Amount of Displacement in Focus Position

The amount of displacement in focus position will be described. The displacement in focus position is caused by the difference in the value of focal length of the objective optical system between near-infrared light and white light. Thus, the amount of displacement in focus position depends on the focal length of the objective optical system.

Furthermore, as described above, the light beam used in formation of an optical image differs between a white light image and a near-infrared light image. In other words, the value of F-number of the objective optical system differs between a white light image and a near-infrared light image. The value of F-number of the objective optical system affects the range of depth of focus. The range of depth of focus affects the displacement in focus position. Thus, the amount of displacement in focus position depends on the F-number of the objective optical system.

Furthermore, it is possible to pick up a white light image and a near-infrared light image with an imager. In this case, the size of pixel pitch of the imager affects the displacement in focus position. Thus, the amount of displacement in focus position depends on the pixel pitch of the imager. The pixel pitch is the distance between two adjacent pixels. For example, it is possible to define the distance between the center of one pixel and the center of the other pixel as the pixel pitch.

For example, in a case where the color filter array of the imager is Bayer arrangement, the imager has pixels that detect red light (R pixels), pixels that detect green light (G pixels), and pixels that detect blue light (B pixels). In this case, two adjacent pixels are R and G pixels, R and B pixels, or G and B pixels.

The amount of displacement in focus position is represented by the following Expression (a):

$$(fir-fe)/(Pich \times Fno) \tag{a}$$

where fir is a focal length of the objective optical system at a predetermined wavelength, fe is a focal length of the objective optical system at e-line, Fno is an F-number of the objective optical system at e-line, Pich is a pixel pitch of an imager, and the predetermined wavelength is 835 nm.

In infrared light observation, it is possible to perform observation with reflected light and observation with fluorescence. When infrared light of 805 nm is used as illumination light, it is possible to perform observation with reflected light of 805 nm. Furthermore, when ICG is used, it is possible to perform observation with fluorescence of 835 nm. The predetermined wavelength may be any wavelength in near-infrared light. Thus, the predetermined wavelength may be 805 nm.

In the objective optical system of the present embodiment, the displacement in focus position is reduced by shifting the position of the near-infrared light image. Hereafter, reducing the displacement in focus position by shifting the position of the near-infrared light image is referred to as "correction".

The larger the amount of displacement in focus position is, the more difficult the correction is. Therefore, even if occurrence of displacement in focus position is allowed, there is a limit to the amount of displacement in focus position that is allowed. It is necessary to set the amount of displacement in focus position represented by Expression (a), in consideration of the allowable limit.

On the other hand, it is possible to set the amount of displacement in focus position freely as long as it is smaller than the allowable limit. Correction is performed on the set amount of displacement in focus position. Thus, the amount of displacement in focus position represented by Expression (a) can be considered as the amount of displacement in focus position to be corrected.

Amount of Shifting of Focus Position in Near-Infrared Light

The amount of shifting of the focus position in near-infrared light will be described. Spherical aberration affects the focus position. By changing spherical aberration in near-infrared light, it is possible to shift the focus position in near-infrared light relative to the focus position in white light.

Spherical aberration is likely to occur in a lens disposed near the pupil of the objective optical system. It is possible to divide the lens into a central region including the optical axis and a peripheral region located outside the central region. By changing the spherical segment amount in the peripheral region of the lens, it is possible to change spherical aberration.

In the objective optical system of the present embodiment, the predetermined lens is disposed near the pupil of the objective optical system. Furthermore, the predetermined lens has a first refractive region and a second refractive region. The first refractive region includes the optical axis and the second refractive region is located outside the first refractive region.

The second refractive region corresponds to the peripheral region. By changing the spherical segment amount in the second refractive region, it is possible to change spherical aberration. Thus, the amount of shifting of the focus position in near-infrared light depends on the spherical segment amount in the second refractive region.

Figure 2:
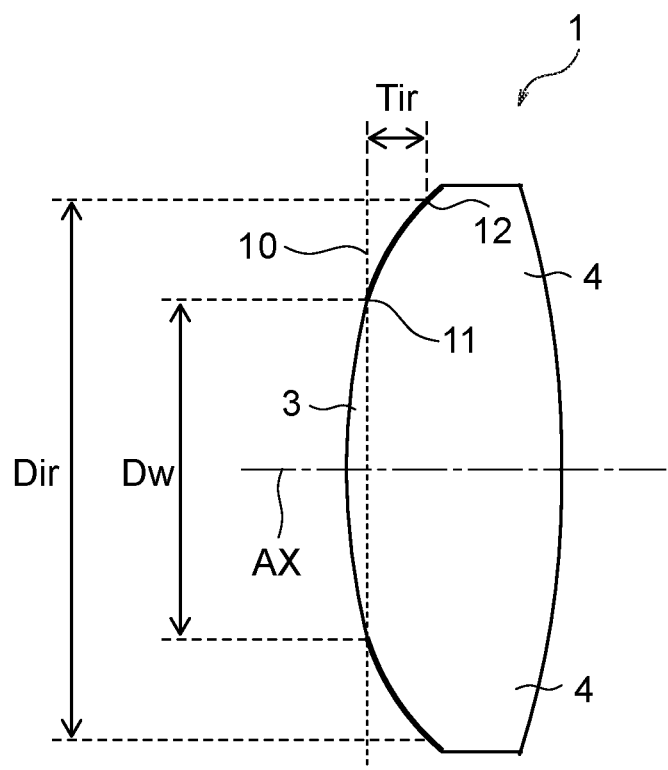
FIG. 2 is a diagram illustrating a spherical segment amount.

FIG. 2 is a diagram illustrating the spherical segment amount. FIG. 2 illustrates a virtual plane 10, a boundary 11, and a boundary 12.

The virtual plane 10 is a plane passing through the boundary 11 and being orthogonal to the optical axis AX. The boundary 11 is the boundary between the first refractive region 3 and the second refractive region 4. The boundary 12 is the outer edge of the aperture that allows near-infrared light to pass through.

In the predetermined lens 1, the distance between the virtual plane 10 and the second refractive region 4 gradually increases from the boundary 11 toward the boundary 12. The distance is a distance in a direction parallel to the optical axis AX. Then, the distance between the virtual plane 10 and the second refractive region 4 is largest at the boundary 12. Thus, the distance between the virtual plane 10 and the second refractive region 4 at the boundary 12 represents the spherical segment amount Tir.

Furthermore, spherical aberration changes with the size of a beam of near-infrared light. The size of a beam of near-infrared light is determined by the aperture diameter through which near-infrared light passes. Thus, the amount of shifting of the focus position in near-infrared light depends on the aperture diameter through which near-infrared light passes.

Furthermore, spherical aberration is proportional to the square of a vignette ratio. The vignette ratio is determined by the aperture diameter through which near-infrared light passes and the aperture diameter through which white light passes. Thus, the amount of shifting of the focus position in near-infrared light depends on the aperture diameter through which near-infrared light passes and the aperture diameter through which white light passes.

The amount of shifting of the focus position in near-infrared light is represented by the following Expression (b):

$$(Dir/Dw)^2 \times (Tir/Dir) \quad \text{(b)}$$

where Dir is an aperture diameter that allows near-infrared light to pass through, Dw is an aperture diameter that allows white light to pass through, Tir is a spherical segment amount in the second refractive region, the spherical segment amount is the maximum distance among distances between a virtual plane and the second refractive region, the virtual plane is a plane passing through a boundary between the first refractive region and the second refractive region and being orthogonal to the optical axis, and the distance is a distance in a direction parallel to the optical axis.

The amount of shifting of the focus position in near-infrared light is the amount used for correction. Thus, the amount of shifting of the focus position in near-infrared light represented by Expression (b) can be considered as the amount of correction.

The displacement in focus position in near-infrared light is produced by changing the spherical aberration in near-infrared light. The amount of shifting of the focus position in near-infrared light represented by Expression (b) can be considered as the amount produced when spherical aberration in near-infrared light is produced.

Conditional Expression (1) represents the ratio of Expression (a) to Expression (b). By satisfying Conditional Expression (1), it is possible to set the amount of displacement in focus position and the amount of shifting of the focus position in near-infrared light as appropriate. As a result, it is possible to correct displacement in focus position favorably.

When a value falls below the lower limit of Conditional Expression (1), the change in spherical aberration in near-infrared light is too small. Therefore, it is impossible to correct the displacement in focus position sufficiently. When a value exceeds the upper limit of Conditional Expression (1), the change in spherical aberration in near-infrared light is too large. Therefore, the imaging performance for near-infrared light is degraded.

In the objective optical system of the present embodiment, the refractive power of the second refractive region is greater than the refractive power of the first refractive region. Furthermore, a light beam transmitted through the second refractive region, that is, the second light beam, includes only the beam of near-infrared light. Thus, in the objective optical system of the present embodiment, the spherical aberration in near-infrared light differs from when the refractive power of the second refractive region is equal to the refractive power of the first refractive region.

In the objective optical system of the present embodiment, the spherical aberration in near-infrared light is intentionally changed. By changing the spherical aberration in near-infrared light, it is possible to change the focus position in near-infrared light relative to the focus position in white light. By satisfying Conditional Expression (1), it is possible to correct displacement in focus position favorably.

In the objective optical system of the present embodiment, it is preferable that the paraxial radius of curvature at a lens surface in the second refractive region is smaller than the paraxial radius of curvature at a lens surface in the first refractive region.

Figure 3A:
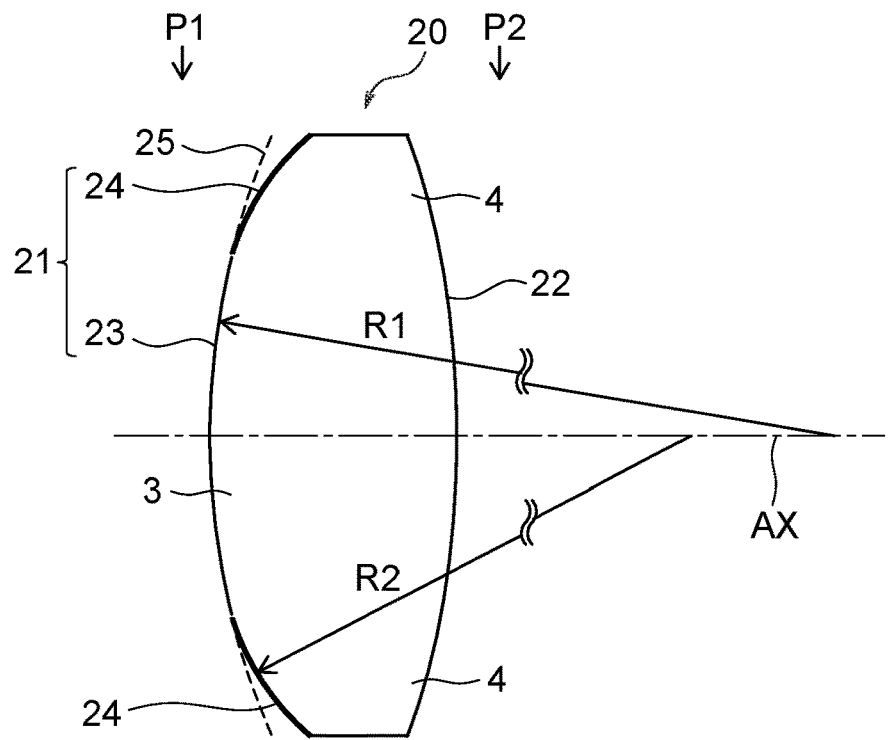
FIG. 3A and FIG. 3B are diagrams illustrating a predetermined lens.
Figure 3B:
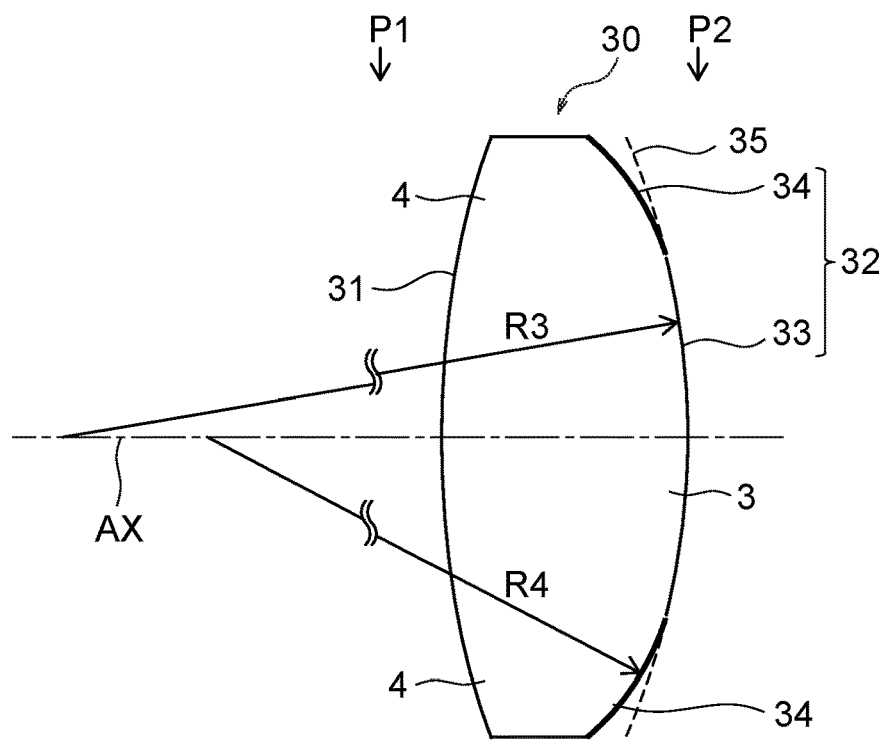

FIG. 3A and FIG. 3B are diagrams illustrating a predetermined lens. FIG. 3A is a diagram illustrating a first example of the predetermined lens. FIG. 3B is a diagram illustrating a second example of the predetermined lens. A position P1 and a position P2 represent the position of the pupil of the objective optical system.

First Example of Predetermined Lens

As illustrated in FIG. 3A, a predetermined lens 20 has an object-side lens surface 21 and an image-side lens surface 22.

The predetermined lens 20 is disposed near the pupil of the objective optical system. The pupil of the objective optical system may be located on the object side of the predetermined lens 20 or located on the image side of the predetermined lens 20.

In the predetermined lens 20, the paraxial radius of curvature at the object-side lens surface 21 changes from the center to the periphery. The paraxial radius of curvature at the image-side lens surface 22 does not change from the center to the periphery.

The object-side lens surface 21 has a lens surface 23 and a lens surface 24. The lens surface 23 is a lens surface in the first refractive region 3. The radius of curvature R1 represents the paraxial radius of curvature of the lens surface 23. The lens surface 24 is a lens surface in the second refractive region 4. The radius of curvature R2 represents the paraxial radius of curvature of the lens surface 24.

An extension surface 25 is a surface extending from the lens surface 23. The lens surface 24 is located closer to the image side than the extension surface 25. The paraxial radius of curvature at the extension surface 25 is equal to the paraxial radius of curvature R1. Thus, the paraxial radius of curvature R2 at the lens surface 24 is smaller than the paraxial radius of curvature R1 at the lens surface 23.

Second Example of Predetermined Lens

As illustrated in FIG. 3B, a predetermined lens 30 has an object-side lens surface 31 and an image-side lens surface 32.

The predetermined lens 30 is disposed near the pupil of the objective optical system. The pupil of the objective optical system may be located on the object side of the predetermined lens 30 or located on the image side of the predetermined lens 30.

In the predetermined lens 30, the paraxial radius of curvature at the object-side lens surface 31 does not change from the center to the periphery. The paraxial radius of curvature at the image-side lens surface 32 changes from the center to the periphery.

The image-side lens surface 32 has a lens surface 33 and a lens surface 34. The lens surface 33 is a lens surface in the first refractive region 3. The radius of curvature R3 represents the paraxial radius of curvature of the lens surface 33. The lens surface 34 is a lens surface in the second refractive region 4. The radius of curvature R4 represents the paraxial radius of curvature of the lens surface 34.

An extension surface 35 is a surface extending from the lens surface 33. The lens surface 34 is located closer to the object side than the extension surface 35. The paraxial radius of curvature at the extension surface 35 is equal to the paraxial radius of curvature R3. Thus, the paraxial radius of curvature R4 at the lens surface 34 is smaller than the paraxial radius of curvature R3 at the lens surface 33.

The smaller the paraxial radius of curvature at the lens surface is, the greater the refractive power is. In the predetermined lens 20, the paraxial radius of curvature R2 is smaller than the paraxial radius of curvature R1. In the predetermined lens 30, the paraxial radius of curvature R4 is smaller than the paraxial radius of curvature R3. Thus, the refractive power of the second refractive region 4 is greater than the refractive power of the first refractive region 3.

The second light beam is transmitted through the second refractive region 4. Since the refractive power of the second refractive region 4 is greater than the refractive power of the first refractive region 3, the second light beam is refracted more greatly than the first light beam.

In the objective optical system of the present embodiment, the second light beam includes only the beam of near-infrared light. Thus, it is possible to bring the position of the near-infrared light image closer to the position of the white light image. As a result, it is possible to reduce the displacement between the position of the near-infrared light image and the position of the white light image.

The predetermined lens may be formed with the object-side lens surface 21 and the image-side lens surface 32. As described above, at the object-side lens surface 21, the paraxial radius of curvature R2 is smaller than the paraxial radius of curvature R1. At the image-side lens surface 32, the paraxial radius of curvature R4 is smaller than the paraxial radius of curvature R3. Thus, the refractive power of the second refractive region 4 is greater than the refractive power of the first refractive region 3.

The refractive power of the first refractive region 3 is determined by the paraxial radius of curvature R1 and the paraxial radius of curvature R3. The refractive power of the second refractive region 4 is determined by the paraxial radius of curvature R2 and the paraxial radius of curvature R4.

Thus, if the paraxial radius of curvature R2 is sufficiently smaller than the paraxial radius of curvature R1, it is possible to make the refractive power of the second refractive region 4 greater than the refractive power of the first refractive region 3 even when the paraxial radius of curvature R4 is greater than the paraxial radius of curvature R3.

In the objective optical system of the present embodiment, it is preferable that the first refractive region has an optical film provided on a lens surface, and the optical film has a characteristic of transmitting white light and near-infrared light.

In the objective optical system of the present embodiment, it is preferable that the second refractive region has an optical film provided on a lens surface, and the optical film has a characteristic of transmitting only near-infrared light.

The optical film provided on the lens surface will be described with the second refractive region.

Figure 4A:
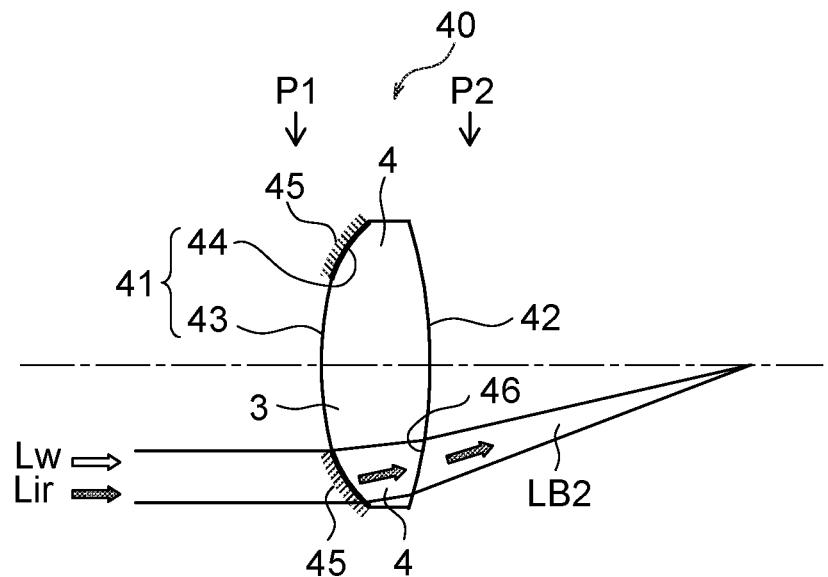
FIG. 4A and FIG. 4B are diagrams illustrating a second refractive region provided with an optical film.
Figure 4B:
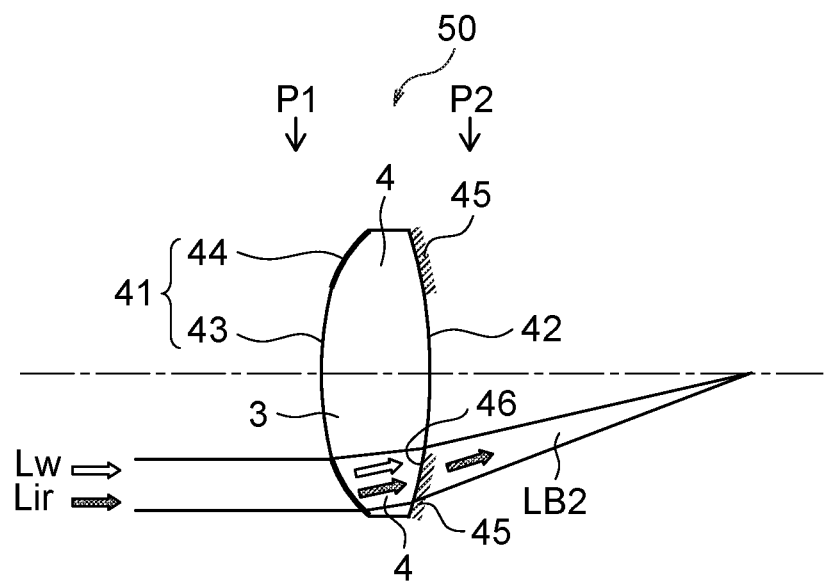

FIG. 4A and FIG. 4B are diagrams illustrating the second refractive region provided with an optical film. FIG. 4A is a diagram illustrating a first example of the second refractive region. FIG. 4B is a diagram illustrating a second example of the second refractive region.

First Example of Second Refractive Region

In the first example of the second refractive region, the second refractive region has an optical film provided on an object-side lens surface.

As illustrated in FIG. 4A, a predetermined lens 40 has an object-side lens surface 41 and an image-side lens surface 42. The object-side lens surface 41 has a lens surface 43 and a lens surface 44. The lens surface 43 is a lens surface in the first refractive region 3. The lens surface 44 is a lens surface in the second refractive region 4.

The paraxial radius of curvature at the lens surface 44 is smaller than the paraxial radius of curvature at the lens surface 43. Thus, the refractive power of the second refractive region 4 is greater than the refractive power of the first refractive region 3.

An optical film is not provided on the lens surface 43. Thus, near-infrared light and white light are transmitted through the lens surface 43.

An optical film 45 is provided on the lens surface 44. The optical film 45 has a characteristic of transmitting only near-infrared light. Thus, near-infrared light is transmitted through the lens surface 44 but white light is not transmitted through the lens surface 44.

When white light Lw is incident on the lens surface 44, the white light Lw is not emitted from the lens surface 44. When near-infrared light Lir is incident on the lens surface 44, the near-infrared light Lir is emitted from the lens surface 44.

The near-infrared light Lir is incident on a peripheral portion 46. The peripheral portion 46 is a lens surface of the second refractive region 4. An optical film is not provided on the peripheral portion 46. Thus, the near-infrared light Lir is transmitted through the peripheral portion 46.

A light beam LB2 is emitted from the peripheral portion 46. The light beam LB2 is a light beam reaching the image plane and transmitted through the second refractive region 4. In the predetermined lens 40, only the near-infrared light Lir is transmitted through the second refractive region 4. In this case, the light beam LB2 includes only near-infrared light. Thus, the light beam LB2 represents the second light beam.

Second Example of Second Refractive Region

In the second example of the second refractive region, the second refractive region has an optical film provided on an image-side lens surface.

As illustrated in FIG. 4B, a predetermined lens 50 has an object-side lens surface 41 and an image-side lens surface 42. An optical film is not provided on the lens surface 43 and the lens surface 44. Thus, near-infrared light and white light are transmitted through the lens surface 43 and the lens surface 44.

When white light Lw is incident on the lens surface 44, the white light Lw is emitted from the lens surface 44. When near-infrared light Lir is incident on the lens surface 44, the near-infrared light Lir is emitted from the lens surface 44.

The white light Lw and the near-infrared light Lir are incident on a peripheral portion 46. An optical film 45 is provided on the peripheral portion 46. Thus, near-infrared light is transmitted through the peripheral portion 46 but white light is not transmitted through the peripheral portion 46.

When white light Lw is incident on the peripheral portion 46, the white light Lw is not emitted from the peripheral portion 46. When near-infrared light Lir is incident on the peripheral portion 46, the near-infrared light Lir is emitted from the peripheral portion 46.

A light beam LB2 is emitted from the peripheral portion 46. The light beam LB2 is a light beam reaching the image plane and transmitted through the second refractive region 4. In the predetermined lens 50, near-infrared light Lir and white light Lw are transmitted through the second refractive region 4. However, since the white light Lw is not emitted from the peripheral portion 46, the light beam LB2 includes only near-infrared light. Thus, the light beam LB2 represents the second light beam.

In the objective optical system of the present embodiment, the second light beam includes only the beam of near-infrared light. Thus, it is possible to bring the position of the near-infrared light image closer to the position of the white light image. As a result, it is possible to reduce the displacement between the position of the near-infrared light image and the position of the white light image.

It is possible to provide the optical film in the second refractive region on one of the object-side lens surface and the image-side lens surface, or on both of the object-side lens surface and the image-side lens surface.

The predetermined lens 40 and the predetermined lens 50 may be disposed such that the object-side lens surface 41 faces the image side.

Optical Film in First Refractive Region

In the predetermined lens 40 and the predetermined lens 50, an optical film is not provided on a lens surface in the first refractive region 3. However, an optical film may be provided on a lens surface in the first refractive region 3.

The first refractive region 3 transmits white light and near-infrared light. Thus, it is desirable that the optical film has a characteristic of transmitting white light and near-infrared light.

The optical film in the first refractive region may be provided on one of the object-side lens surface and the image-side lens surface, or on both of the object-side lens surface and the image-side lens surface.

In the objective optical system of the present embodiment, it is preferable that a flat plate is disposed near the predetermined lens, the flat plate has a first transmission region and a second transmission region, the second transmission region has a characteristic of transmitting only near-infrared light, the first light beam includes light transmitted through the first transmission region, and the second light beam includes light transmitted through the second transmission region.

Figure 5A:
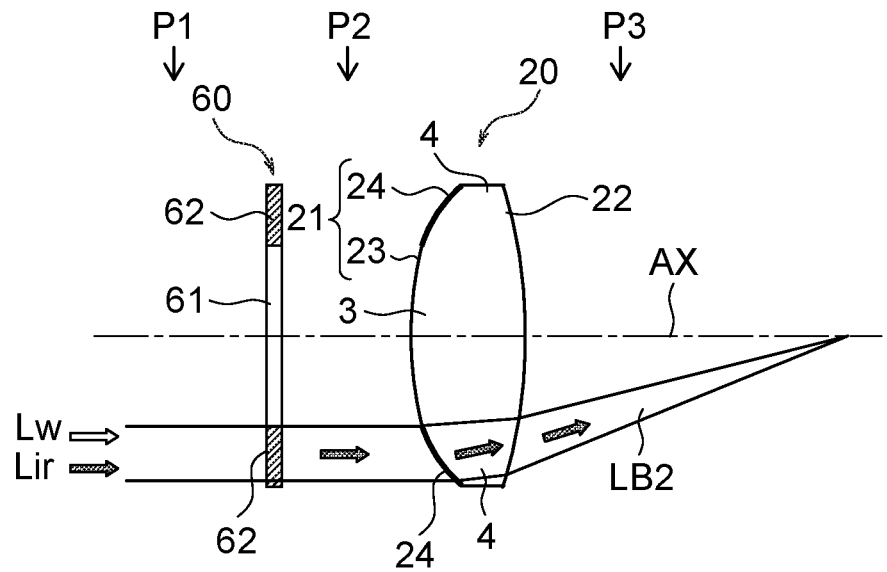
FIG. 5A and FIG. 5B are diagrams illustrating arrangement of a predetermined lens and a flat plate.
Figure 5B:
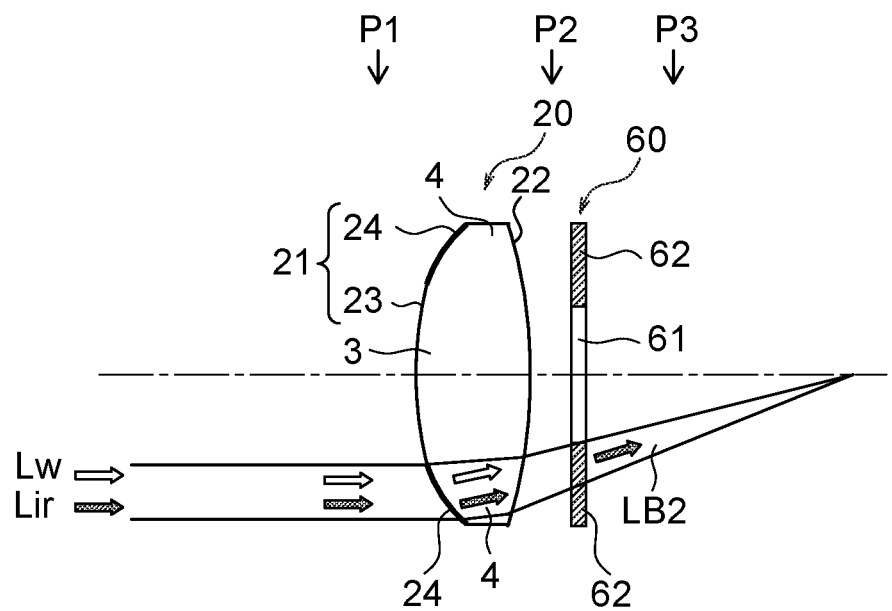

FIG. 5A and FIG. 5B are diagrams illustrating arrangement of the predetermined lens and the flat plate. FIG. 5A is a diagram illustrating a first example of the arrangement. FIG. 5B is a diagram illustrating a second example of the arrangement. The same configurations as in FIG. 3A and FIG. 3B are denoted by the same numerals and will not be further elaborated.

A position P3 represents the position of the pupil of the objective optical system. The second light beam is illustrated in the drawings, but the first light beam is not illustrated in the drawings.

The objective optical system of the present embodiment includes a predetermined lens 20 and a flat plate 60. The flat plate 60 is disposed near the predetermined lens 20. The flat plate 60 has a first transmission region 61 and a second transmission region 62.

The first transmission region 61 includes the optical axis AX. The second transmission region 62 is located outside the first transmission region 61. The cross-sectional shape of the first transmission region 61 is circular. The cross-sectional shape of the second transmission region 62 is annular.

The first transmission region 61 has a characteristic of transmitting white light and near-infrared light. Thus, white light and near-infrared light are transmitted through the first transmission region 61.

The second transmission region 62 has a characteristic of transmitting only near-infrared light. Thus, near-infrared light is transmitted through the second transmission region 62 but white light is not transmitted through the second transmission region 62.

The first light beam includes light transmitted through the first transmission region, and the second light beam includes light transmitted through the second transmission region.

First Example of Arrangement

As illustrated in FIG. 5A, in the first example of the arrangement, the flat plate 60 is disposed on the object side of the predetermined lens 20.

The predetermined lens 20 is disposed near the pupil of the objective optical system. The pupil of the objective optical system may be located on the object side of the flat plate 60, or between the flat plate 60 and the predetermined lens 20, or on the image side of the predetermined lens 20.

When white light Lw is incident on the transmission region 62, the white light Lw is not emitted from the transmission region 62. When near-infrared light Lir is incident on the transmission region 62, the near-infrared light Lir is emitted from the transmission region 62. Thus, only the near-infrared light Lir is incident on the second refractive region 4.

When near-infrared light Lir is incident on the second refractive region 4, the near-infrared light Lir is emitted from the second refractive region 4. Thus, only the near-infrared light Lir is emitted from the second refractive region 4.

The light beam LB2 emitted from the second refractive region 4 is a light beam reaching the image plane and transmitted through the second refractive region 4. In the predetermined lens 20, only the near-infrared light Lir is transmitted through the second refractive region 4. In this case, the light beam LB2 includes only near-infrared light. Thus, the light beam LB2 represents the second light beam.

In the first example of the arrangement, light transmitted through the first transmission region 61 is transmitted through the first refractive region 3. The first light beam is formed with the light emitted from the first refractive region 3. Thus, the first light beam includes light transmitted through the first transmission region 61.

Furthermore, light transmitted through the first transmission region 61 is transmitted through the second refractive region 4. The second light beam is formed with the light emitted from the second refractive region 4. Thus, the second light beam includes light transmitted through the first transmission region 61.

Second Example of Arrangement

As illustrated in FIG. 5B, in the second example of the arrangement, the flat plate 60 is disposed on the image side of the predetermined lens 20.

The predetermined lens 20 is disposed near the pupil of the objective optical system. The pupil of the objective optical system may be located on the object side of the predetermined lens 20, or located between the flat plate 60 and the predetermined lens 20, or located on the image side of the flat plate 60.

In the second example of the arrangement, light transmitted through the first refractive region 3 is incident on the first transmission region 61, and light transmitted through the second refractive region 4 is incident on the second transmission region 62.

When white light Lw is incident on the second refractive region 4, the white light Lw is emitted from the second refractive region 4. When near-infrared light Lir is incident on the second refractive region 4, the near-infrared light Lir is emitted from the second refractive region 4. Thus, the white light Lw and the near-infrared light Lir are incident on the transmission region 62.

When white light Lw is incident on the transmission region 62, the white light Lw is not emitted from the transmission region 62. When near-infrared light Lir is incident on the transmission region 62, the near-infrared light Lir is emitted from the transmission region 62. Thus, only the near-infrared light Lir is emitted from the transmission region 62.

The light beam LB2 emitted from the transmission region 62 is a light beam reaching the image plane and transmitted through the second refractive region 4. In the predetermined lens 20, near-infrared light Lir and white light Lw are transmitted through the second refractive region 4. However, since the white light Lw is not emitted from the transmission region 62, the light beam LB2 includes only near-infrared light. Thus, the light beam LB2 represents the second light beam.

In the second example of the arrangement, light transmitted through the first refractive region 3 is transmitted through the first transmission region 61. The first light beam is formed with light emitted from the first transmission region 61. Thus, the first light beam includes light transmitted through the first transmission region 61.

Furthermore, light transmitted through the second refractive region 4 is transmitted through the second transmission region 62. The second light beam is formed with light emitted from the second transmission region 62. Thus, the second light beam includes light transmitted through the second transmission region 62.

In the objective optical system of the present embodiment, it is preferable that the first transmission region has an optical film provided on an optical surface, and the optical film has a characteristic of transmitting white light and near-infrared light.

In the objective optical system of the present embodiment, it is preferable that the second transmission region has an optical film provided on an optical surface, and the optical film has a characteristic of transmitting only near-infrared light.

The optical film provided on the optical surface will be described with the second transmission region.

Figure 6:
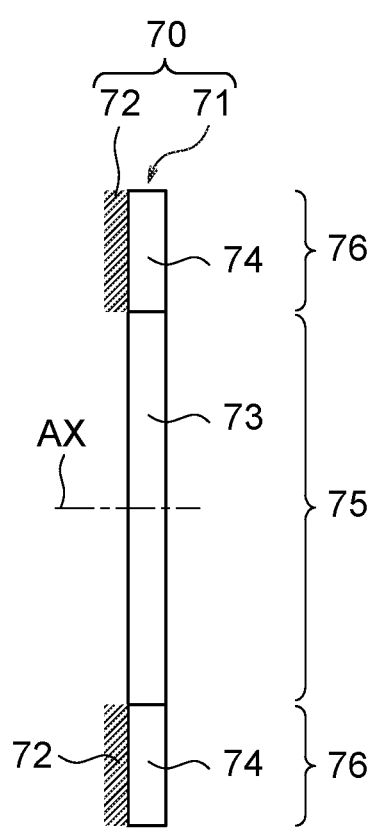
FIG. 6 is a diagram illustrating a flat plate.

FIG. 6 is a diagram illustrating a flat plate. A flat plate 70 has an optical substrate 71 and an optical film 72. The optical substrate 71 has two optical surfaces. The two optical surfaces are both planar. For example, colorless transparent glass or colorless transparent resin is used as the optical substrate 71. Thus, white light and near-infrared light are transmitted through the optical substrate 71.

Furthermore, the optical substrate 71 has a central portion 73 and a peripheral portion 74. The central portion 73 includes the optical axis AX. The peripheral portion 74 is located outside the central portion 73. The cross-sectional shape of the central portion 73 is circular. The cross-sectional shape of the peripheral portion 74 is annular.

The flat plate 70 has a first transmission region 75 and a second transmission region 76. The first transmission region 75 includes the optical axis AX. The second transmission region 76 is located outside the first transmission region 75. The cross-sectional shape of the first transmission region 75 is circular. The cross-sectional shape of the second transmission region 76 is annular.

The first transmission region 75 is formed with the central portion 73. The second transmission region 76 is formed with the peripheral portion 74 and the optical film 72.

The first transmission region 75 has a characteristic of transmitting white light and near-infrared light. Thus, white light and near-infrared light are transmitted through the first transmission region 75.

The second transmission region 76 has the optical film 72. The optical film 72 is provided on the optical surface of the optical substrate 71. The optical film 72 has a characteristic of transmitting only near-infrared light. Thus, near-infrared light is transmitted through the second transmission region 76 but white light is not transmitted through the second transmission region 76.

It is possible to provide the optical film in the second transmission region on one of the two optical surfaces or on both of the two optical surfaces.

It is possible to form the central portion 73 and the peripheral portion 74 with a material having a refractive index greater than 1. When the material of the central portion 73 and the material of the peripheral portion 74 are the same, a physical boundary does not exist between the central portion 73 and the peripheral portion 74.

It is possible to form the central portion 73 as a through hole. In this case, the refractive index of the central portion 73 is 1 because the central portion 73 is formed of air. On the other hand, the peripheral portion 74 is formed of a material having a refractive index greater than 1. Thus, a physical boundary exists between the central portion 73 and the peripheral portion 74.

In the objective optical system of the present embodiment, it is preferable that the flat plate is formed of an absorptive optical filter.

When the central portion 73 is a through hole, it is possible to use an absorptive optical filter for the peripheral portion 74. As a result, it is possible to form the flat plate with an absorptive optical filter. By imparting a characteristic of absorbing white light to the optical filter, it is not necessary to provide an optical film on the optical surface of the optical substrate 71.

Optical Film in First Transmission Region

In the flat plate 70, an optical film is not provided on the optical surface in the first transmission region 75. However, an optical film may be provided on the optical surface in the first transmission region 75.

The first transmission region 75 transmits white light and near-infrared light. Thus, it is desirable that the optical film has a characteristic of transmitting white light and near-infrared light.

It is possible to provide the optical film in the first transmission region on one of the two optical surfaces or on both of the two optical surfaces.

An image pickup apparatus of the present embodiment includes an objective optical system including a predetermined lens disposed near a pupil of the objective optical system. The predetermined lens has a first refractive region including an optical axis and a second refractive region located outside the first refractive region. A refractive power of the second refractive region is greater than a refractive power of the first refractive region. A light beam reaching an image plane includes a first light beam and a second light beam. The first light beam is a light beam transmitted through the first refractive region and includes at least one of a beam of white light and a beam of near-infrared light. The second light beam is a light beam transmitted through the second refractive region and includes only the beam of near-infrared light.

An endoscope of the present embodiment includes an objective optical system including a predetermined lens disposed near a pupil of the objective optical system. The predetermined lens has a first refractive region including an optical axis and a second refractive region located outside the first refractive region. A refractive power of the second refractive region is greater than a refractive power of the first refractive region. A light beam reaching an image plane includes a first light beam and a second light beam. The first light beam is a light beam transmitted through the first refractive region and includes at least one of a beam of white light and a beam of near-infrared light. The second light beam is a light beam transmitted through the second refractive region and includes only the beam of near-infrared light.

In the objective optical system of the present embodiment, the brightness in a near-infrared light image is sufficient, the color reproducibility in a white light image is high, and the displacement between the position of the near-infrared light image and the position of the white light image is small. Thus, with the image pickup apparatus of the present embodiment and the endoscope of the present embodiment, it is possible to obtain a bright near-infrared light image and a white light image with high color reproducibility and to acquire a near-infrared light image and a white light image that are both sharp. In other words, in an image pickup apparatus or an endoscope, it is possible to obtain a bright near-infrared light image and a white light image with high color reproducibility and to acquire a near-infrared light image and a white light image that are both sharp.

Examples of the objective optical system will be described in detail below based on the drawings. The present disclosure is not limited by these examples.

Figure 7:
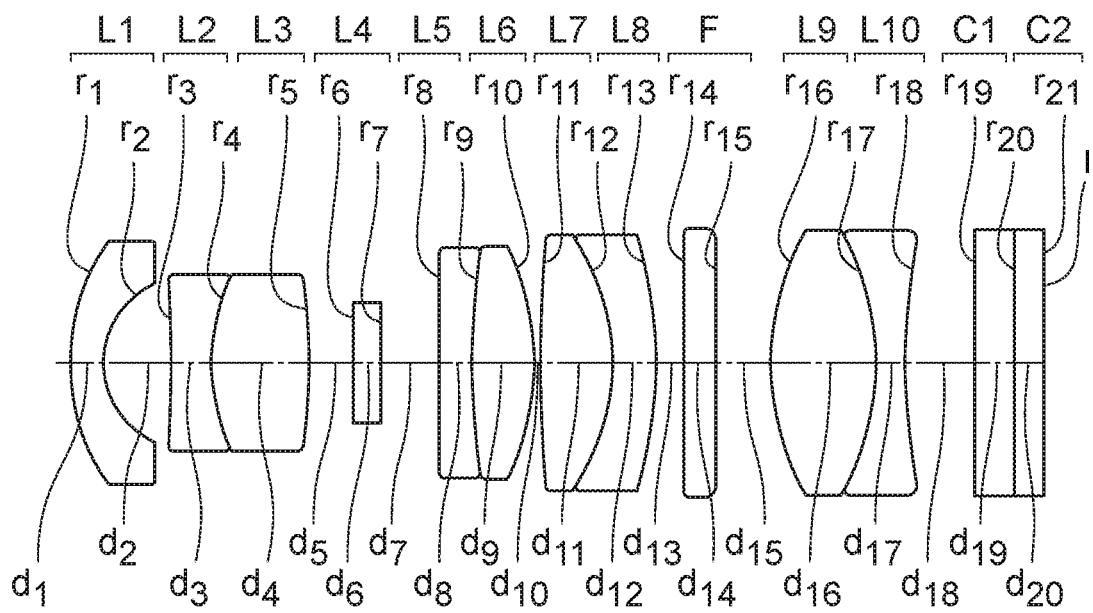
FIG. 7 is a lens cross-sectional view of an objective optical system of Example 1.
Figure 9:
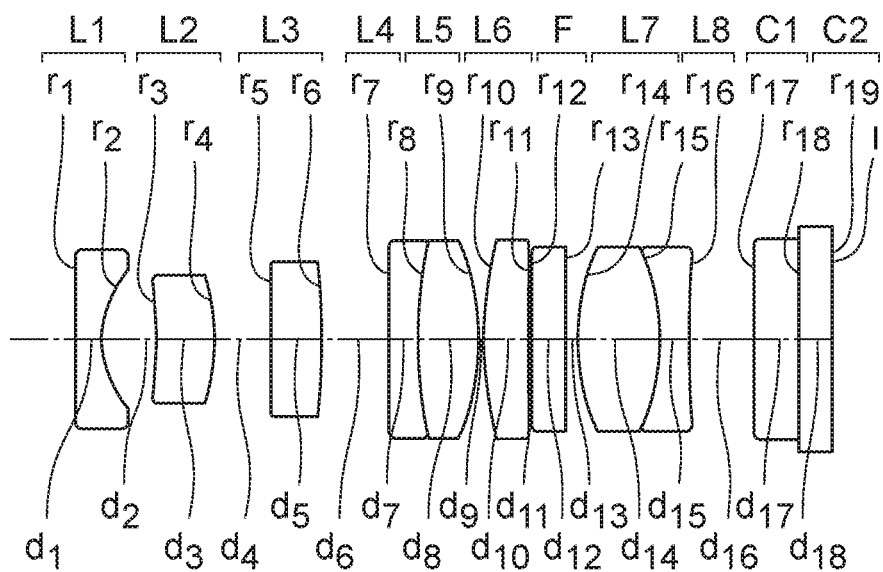
FIG. 9 is a lens cross-sectional view of an objective optical system of Example 2.
Figure 11:
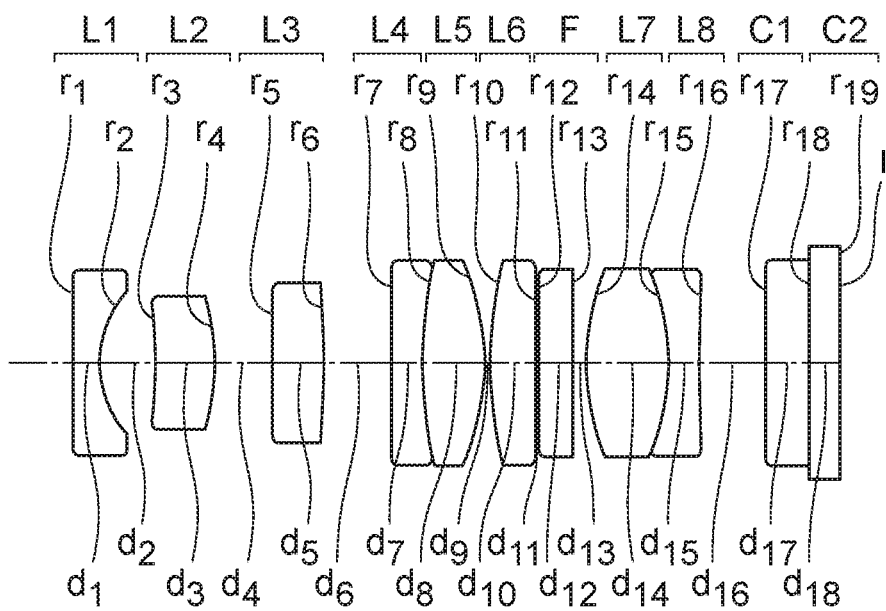
FIG. 11 is a lens cross-sectional view of an objective optical system of Example 3.

FIG. 7, FIG. 9, and FIG. 11 are lens cross-sectional views of the examples. In the lens cross-sectional views, F represents an optical filter, and C1 and C2 represent cover glasses.

Figure 8A:
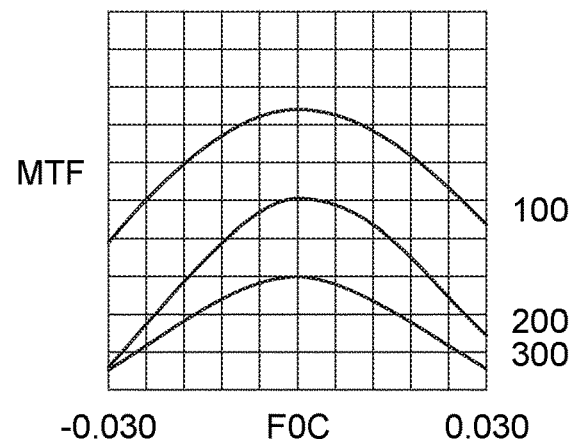
FIG. 8A, FIG. 8B and FIG. 8C are diagrams illustrating the MTF of the objective optical system of Example 1.
Figure 8B:
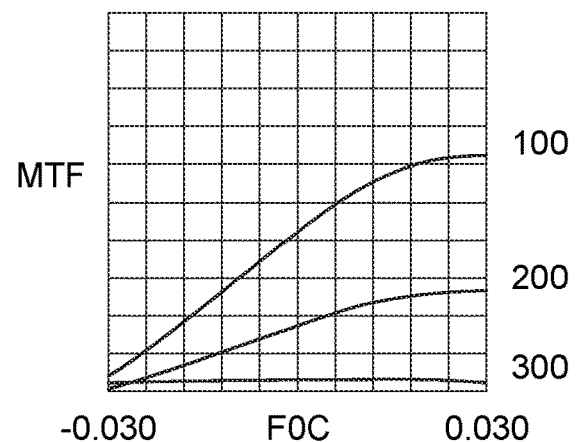
Figure 8C:
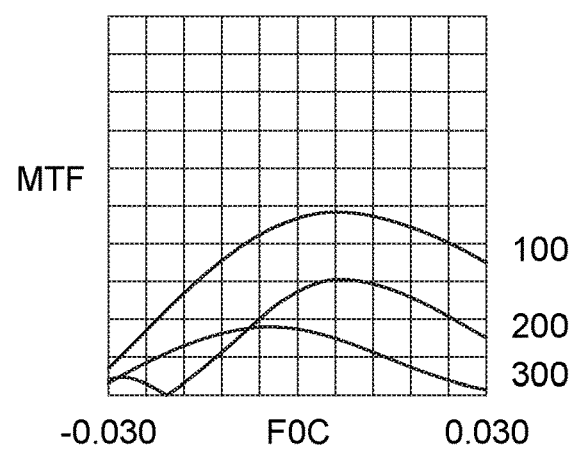
Figure 10A:
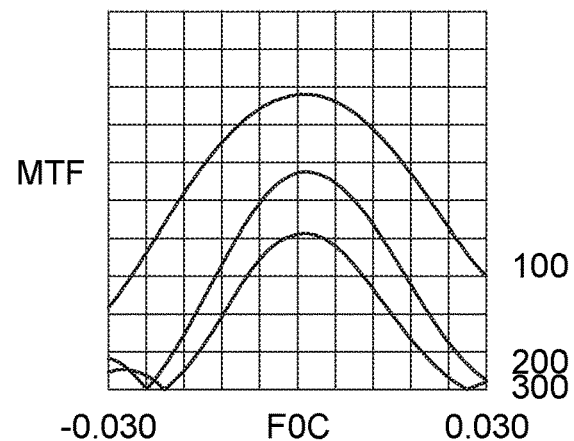
FIG. 10A, FIG. 10B and FIG. 10C are diagrams illustrating the MTF of the objective optical system of Example 2.
Figure 10B:
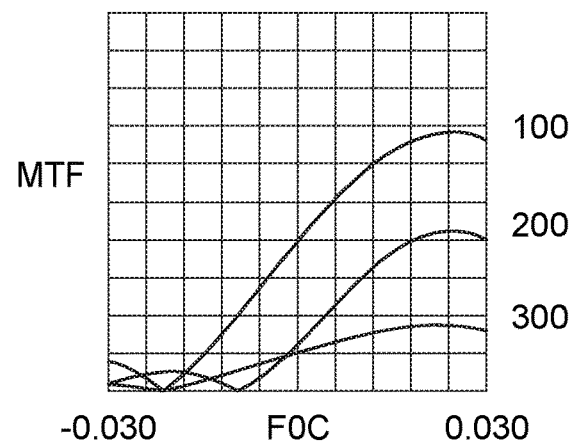
Figure 10C:
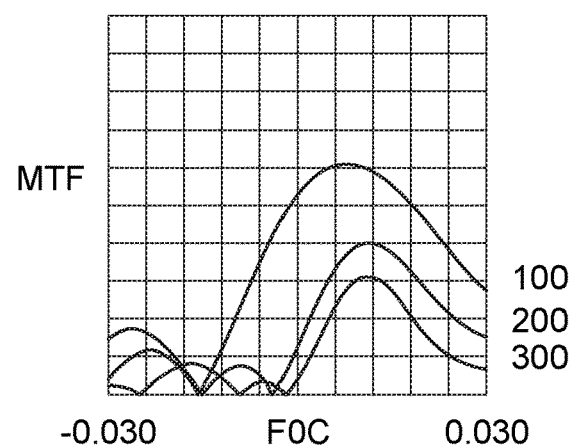
Figure 12A:
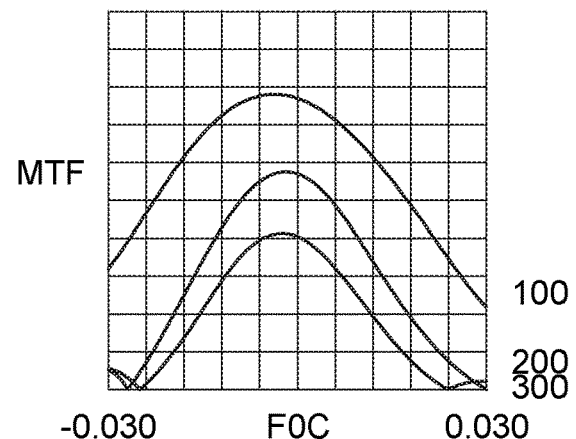
FIG. 12A, FIG. 12B and FIG. 12C are diagrams illustrating the MTF of the objective optical system of Example 3.
Figure 12B:
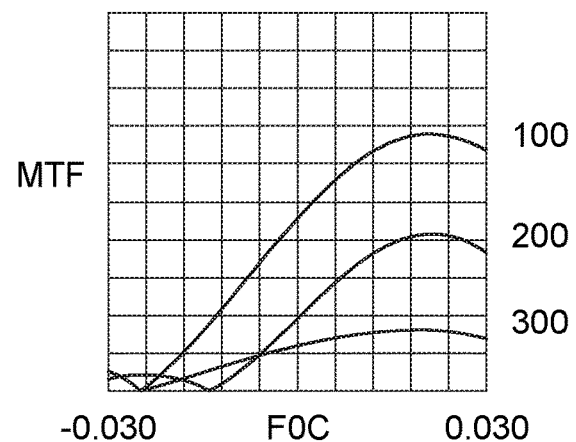
Figure 12C:
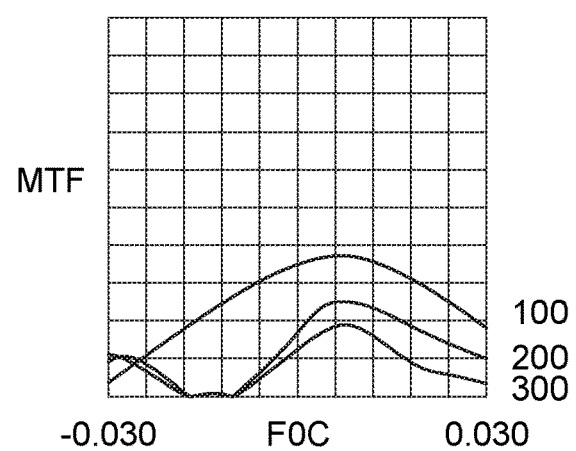

FIGS. 8A to 8C, FIGS. 10A to 10C, and FIGS. 12A to 12C illustrate the MTF of the examples. In MTF, the horizontal axis represents the amount of defocus. FIG. 8A, FIG. 10A, and FIG. 12A are the MTF of white light in the first light beam. FIG. 8B, FIG. 10B, and FIG. 12B are the MTF of near-infrared light in the first light beam. FIG. 8C, FIG. 10C, and FIG. 12C are the MTF of near-infrared light in the first light beam and the second light beam. Furthermore, 100, 200, and 300 represent spatial frequencies.

An objective optical system of Example 1 includes a negative meniscus lens L1 having a convex surface facing the object side, a biconcave negative lens L2, a biconvex positive lens L3, a plano-convex positive lens L4, a plano-concave negative lens L5, a biconvex positive lens L6, a biconvex positive lens L7, a negative meniscus lens L8 having a convex surface facing the image side, a biconvex positive lens L9, and a biconcave negative lens L10.

The biconcave negative lens L2 and the biconvex positive lens L3 are cemented. The plano-concave negative lens L5 and the biconvex positive lens L6 are cemented. The biconvex positive lens L7 and the negative meniscus lens L8 are cemented. The biconvex positive lens L9 and the biconcave negative lens L10 are cemented.

Aspheric surfaces are provided on a total of three surfaces, namely, both surfaces of the negative meniscus lens L1 and the object-side surface of the plano-convex positive lens L4.

An optical filter F is disposed between the negative meniscus lens L8 and the biconvex positive lens L9. A cover glass C1 and a cover glass C2 are disposed on the image side of the biconcave negative lens L10.

An objective optical system of Example 2 includes a plano-concave negative lens L1, a positive meniscus lens L2 having a convex surface facing the image side, a plano-convex positive lens L3, a plano-concave negative lens L4, a biconvex positive lens L5, a plano-convex positive lens L6, a biconvex positive lens L7, and a biconcave negative lens L8.

The biconcave negative lens L4 and the biconvex positive lens L5 are cemented. The biconvex positive lens L7 and the biconcave negative lens L8 are cemented.

An aspheric surface is provided on the object-side surface of the plano-convex positive lens L3.

An optical filter F is disposed between the plano-convex positive lens L6 and the biconvex positive lens L7. A cover glass C1 and a cover glass C2 are disposed on the image side of the biconcave negative lens L8.

An objective optical system of Example 3 includes a plano-concave negative lens L1, a positive meniscus lens L2 having a convex surface facing the image side, a plano-convex positive lens L3, a plano-concave negative lens L4, a biconvex positive lens L5, a plano-convex positive lens L6, a biconvex positive lens L7, and a biconcave negative lens L8.

The biconcave negative lens L4 and the biconvex positive lens L5 are cemented. The biconvex positive lens L7 and the biconcave negative lens L8 are cemented.

An aspheric surface is provided on the object-side surface of the plano-convex positive lens L3.

An optical filter F is disposed between the plano-convex positive lens L6 and the biconvex positive lens L7. A cover glass C1 and a cover glass C2 are disposed on the image side of the biconcave negative lens L8.

Numerical data of the examples above is listed below. In the surface data, r is the radius of curvature of each lens surface, d is the distance between lens surfaces, ne is the refractive index of each lens at e-line, vd is the Abbe number of each lens for e-line, and ER is the effective aperture. The effective aperture represents the aperture diameter that allows infrared light to pass through.

Furthermore, the aspheric shape is represented by the following equation when the optical axis direction is z, the direction orthogonal to the optical axis is y, the conic coefficient is K, and the aspheric coefficient is A4, A6, A8, A10, A12, . . .

$$z=(y^2/r)/[1+\{1-(1+K)(y/r)^2\}^{1/2}]+A4y^4+A6y^6+A8y^8+A10y^{10}+A12y^{12}+\ldots$$

Furthermore, in the aspheric coefficient, "E-n" (n is an integer) indicates "$10^{-n}$". The symbols used for these parameters are the same in the numerical data in the examples described below.

Numerical Example 1 unit mm

Surface data

| surface no. | r | d | ne | vd | ER |
|---|---|---|---|---|---|
| Object plane | ∞ | 46.5 | | | |
| 1* | 2.9142 | 0.4 | 1.81093 | 40.91 | 1.530 |
| 2* | 1.0606 | 0.84 | | | 1.000 |
| 3 | −18.377 | 0.5 | 2.00912 | 29.14 | 1.070 |
| 4 | 2.634 | 1.2 | 1.85504 | 23.78 | 1.120 |
| 5 | −8.532 | 0.547 | | | 1.120 |
| 6* | ∞ | 0.35 | 1.65425 | 58.55 | 0.600 |
| 7 | −35.645 | 0.72 | | | 0.600 |
| 8 | ∞ | 0.4 | 2.00912 | 29.14 | 1.450 |
| 9 | 9.972 | 0.78 | 1.80642 | 34.97 | 1.450 |
| 10 | −3.375 | 0.08 | | | 1.450 |
| 11 | 24.688 | 0.9 | 1.73234 | 54.68 | 1.600 |
| 12 | −2.782 | 0.53 | 1.93429 | 18.9 | 1.600 |
| 13 | −5.625 | 0.35 | | | 1.600 |
| 14 | ∞ | 0.4 | 1.47311 | 66.02 | 1.600 |
| 15 | ∞ | 0.679 | | | 1.600 |
| 16 | 3.375 | 1.3 | 1.73234 | 54.68 | 1.650 |
| 17 | −3.375 | 0.35 | 2.00912 | 29.14 | 1.650 |
| 18 | 8.042 | 0.856 | | | 1.450 |
| 19 | ∞ | 0.5 | 1.51825 | 64.14 | 1.700 |
| 20 | ∞ | 0.36 | 1.507 | 63.26 | 1.600 |
| 21 | ∞ | 0 | | | |
| image plane | ∞ | | | | |

Aspheric data

1st surface $K = 0.8038$
$A4 = 7.5461E-04$, $A6 = 5.6034E-04$, $A8 = -1.8566E-04$ 2nd surface $K = -0.1138$
$A4 = 2.5141E-03$, $A6 = -7.2518E-04$, $A8 = 4.5926E-03$ 6th surface $K = 0$
$A8 = 6.00E-02$

Numerical Example 2 unit mm

Surface data

| surface no. | r | d | ne | vd | ER |
|---|---|---|---|---|---|
| Object plane | ∞ | 50.2 | | | |
| 1 | ∞ | 0.3 | 1.97927 | 28.27 | 0.950 |
| 2 | 1.243 | 0.62 | | | 0.800 |
| 3 | −6.962 | 0.67 | 1.89136 | 18.9 | 0.750 |
| 4 | −2.703 | 0.65 | | | 0.750 |
| 5* | ∞ | 0.58 | 1.58193 | 61.14 | 0.700 |
| 6 | −10.145 | 0.77 | | | 0.900 |
| 7 | ∞ | 0.35 | 1.82308 | 23.78 | 1.150 |
| 8 | 5.994 | 0.7 | 1.76113 | 49.6 | 1.150 |
| 9 | −2.908 | 0.06 | | | 1.150 |
| 10 | 4.48 | 0.52 | 1.58193 | 61.14 | 1.150 |
| 11 | ∞ | 0.03 | | | 1.050 |
| 12 | ∞ | 0.4 | 1.46916 | 66.02 | 1.050 |
| 13 | ∞ | 0.14 | | | 1.050 |
| 14 | 2.665 | 0.93 | 1.51022 | 64.14 | 1.050 |
| 15 | −2.665 | 0.35 | 1.92401 | 17.47 | 1.050 |
| 16 | 21.765 | 0.744 | | | 1.050 |
| 17 | ∞ | 0.5 | 1.51022 | 64.14 | 1.100 |
| 18 | ∞ | 0.36 | 1.50266 | 63.26 | 1.100 |
| 19 | ∞ | 0 | | | |
| Image plane | ∞ | | | | |

Aspheric data

5th surface $K = 0$
$A4 = 5.00E-03$

Numerical Example 3 unit mm

Surface data

| surface no. | r | d | ne | vd | ER |
|---|---|---|---|---|---|
| Object plane | ∞ | 50.2 | | | |
| 1 | ∞ | 0.3 | 1.97927 | 28.27 | 0.950 |
| 2 | 1.243 | 0.62 | | | 0.800 |
| 3 | −6.962 | 0.67 | 1.89136 | 18.9 | 0.750 |
| 4 | −2.703 | 0.65 | | | 0.750 |
| 5* | ∞ | 0.58 | 1.58193 | 61.14 | 0.770 |
| 6 | −10.145 | 0.77 | | | 0.900 |
| 7 | ∞ | 0.35 | 1.82308 | 23.78 | 1.150 |
| 8 | 5.994 | 0.7 | 1.76113 | 49.6 | 1.150 |
| 9 | −2.908 | 0.06 | | | 1.150 |
| 10 | 4.48 | 0.52 | 1.58193 | 61.14 | 1.150 |
| 11 | ∞ | 0.03 | | | 1.050 |
| 12 | ∞ | 0.4 | 1.46916 | 66.02 | 1.050 |
| 13 | ∞ | 0.14 | | | 1.050 |
| 14 | 2.665 | 0.93 | 1.51022 | 64.14 | 1.050 |
| 15 | −2.665 | 0.35 | 1.92401 | 17.47 | 1.050 |
| 16 | 21.765 | 0.744 | | | 1.050 |
| 17 | ∞ | 0.5 | 1.51022 | 64.14 | 1.100 |
| 18 | ∞ | 0.36 | 1.50266 | 63.26 | 1.100 |
| 19 | ∞ | 0 | | | |
| Image plane | ∞ | | | | |

Aspheric data

5th surface $K = 0$
$A4 = 8.00E-03$

Values of parameters of each example are shown below.

| Parameter | Example 1 | Example 2 | Example 3 |
|---|---|---|---|
| Dir | 1.200 | 1.400 | 1.540 |
| Dw | 0.8500 | 0.8600 | 0.8600 |
| Tir | 0.001 | 0.001 | 0.0025 |
| fir | 1.459 | 1.168 | 1.168 |
| fe | 1.441 | 1.156 | 1.156 |
| pich | 0.0015 | 0.0015 | 0.0015 |
| Fno | 3.486 | 2.867 | 2.867 |

Values of conditional expressions of each example are shown below.

conditional expressions Example 1 Example 2 Example 3

$$\{(Dir/Dw)^2 \times (Tir/Dir)\} \quad (1)$$

$/\{(fir-fe)/(Pich \times Fno)\}$ 0.0005 0.0007 0.0018

Figure 13:
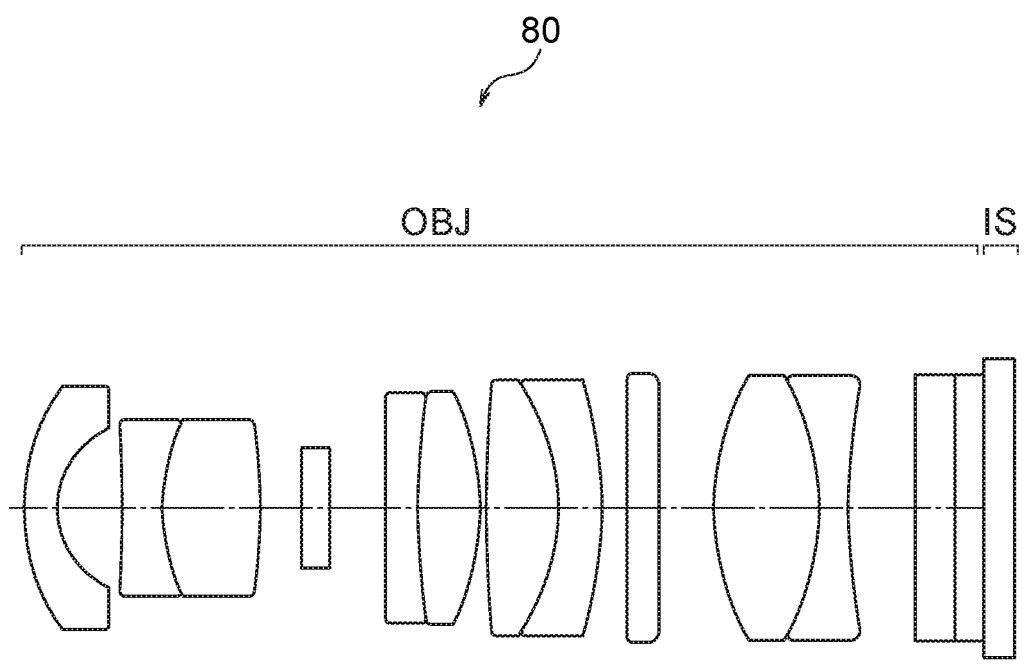
FIG. 13 is a diagram illustrating an optical apparatus of the present embodiment.

FIG. 13 is a diagram illustrating an optical apparatus of the present embodiment. An optical apparatus 80 is an image pickup apparatus or an endoscope. The optical apparatus 80 includes the objective optical system OBJ.

In the optical apparatus 80, it is possible to use an imager IS. In this case, it is possible to pick up an optical image formed by the objective optical system OBJ with the imager IS. As a result, it is possible to acquire an image.

Figure 14A:
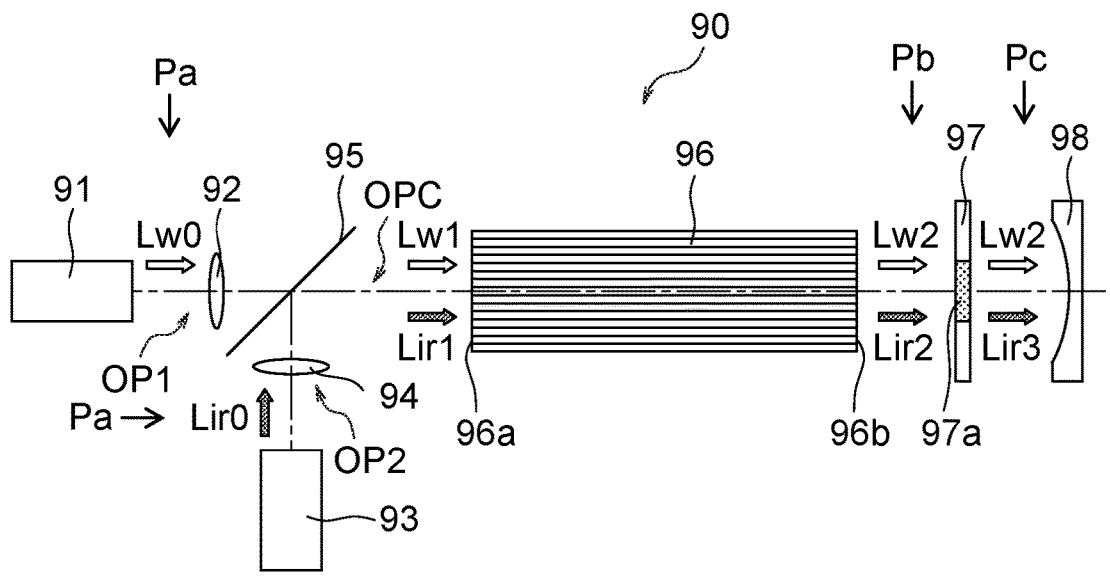
FIG. 14A, FIG. 14B, FIG. 14C, FIG. 14D, FIG. 14E and FIG. 14F are diagrams illustrating an illumination apparatus and light distribution characteristics.

An illumination apparatus used in the optical apparatus of the present embodiment will be described. FIG. 14A to FIG. 14F are diagrams illustrating an illumination apparatus and light distribution characteristics. FIG. 14A is a diagram illustrating the illumination apparatus. FIG. 14B, FIG. 14C, FIG. 14D, FIG. 14E, and FIG. 14F are diagrams illustrating light distribution characteristics. In the diagrams illustrating light distribution characteristics, the vertical axis represents light intensity. The horizontal axis represents the distance from the optical axis, or the angle.

In the optical apparatus of the present embodiment, for example, an endoscope, normal light observation and near-infrared light observation are performed. The illumination apparatus for the endoscope includes a light source for normal light observation and a light source for near-infrared light observation. The illumination apparatus for the endoscope will be described.

An illumination apparatus 90 includes a light source 91, a lens 92, a light source 93, a lens 94, a dichroic mirror 95, a light guide 96, an optical filter 97, and an illumination lens 98.

The light source 91 and the lens 92 are disposed in a first optical path OP1. The light source 93 and the lens 94 are disposed in a second optical path OP2.

The light source 91 is a light source for normal light observation. For example, a white LED is used for the light source 91. White light Lw0 is emitted from the light source 91. The light source 93 is a light source for near-infrared light observation. For example, a near-infrared LD is used for the light source 93. Near-infrared light Lir0 is emitted from the light source 93. The light source 93 may be a light source that emits heat radiation.

Figures 14B, 14C, 14D, 14E, 14F:

FIG. 14B illustrates the light distribution characteristic at a position Pa. The numerical aperture of the near-infrared light Lir0 is smaller than the numerical aperture of the white light Lw0. Therefore, as illustrated in FIG. 14B, the light distribution in the near-infrared light Lir0 is narrower than the light distribution in the white light Lw0.

When the white light Lw0 and the near-infrared light Lir0 are used for illumination, the brightness at the periphery of the field of view is darker in near-infrared light observation than in normal light observation. Therefore, observation is hindered. To reduce the difference in brightness at the periphery of the field of view, it is only necessary that the light distribution in the near-infrared light Lir0 and the light distribution in the white light Lw0 are substantially matched.

In the illumination apparatus 90, the white light Lw0 is incident on the lens 92. In the lens 92, the light beam diameter of the white light Lw0 is enlarged. White light Lw1 is emitted from the lens 92. The near-infrared light Lir0 is incident on the lens 94. In the lens 94, the light beam diameter of the near-infrared light Lir0 is enlarged. Near-infrared light Lir1 is emitted from the lens 94.

The dichroic mirror 95 is disposed at the position where the first optical path OP1 and the second optical path OP2 intersect. The dichroic mirror 95 has a characteristic of transmitting white light and reflecting near-infrared light. Thus, the white light Lw1 and the near-infrared light Lir1 are emitted from the dichroic mirror 95.

A common optical path OPC is located on the extension of the first optical path OP1. The light guide 96 is disposed in the common optical path OPC. The white light Lw1 and the near-infrared light Lir1 travel along the common optical path OPC and reach the light guide 96.

The light guide 96 has an incidence surface 96a and an emission surface 96b. The white light Lw1 and the near-infrared light Lir1 are incident on the light guide 96 from the incidence surface 96a.

In the lens 92, the light beam diameter is enlarged such that the light beam diameter of the white light Lw1 becomes larger than the incidence surface 96a. In the lens 94, the light beam diameter is enlarged such that the light beam diameter of the near-infrared light Lir1 becomes larger than the incidence surface 96a. Thus, part of the white light Lw1 and part of the near-infrared light Lir1 are propagated through the light guide 96. As a result, white light Lw2 and near-infrared light Lir2 are emitted from the emission surface 96b.

FIG. 14C illustrates the light distribution characteristic at a position Pb. As illustrated in FIG. 14C, part of the white light Lw1 is emitted as the white light Lw2. Part of the near-infrared light Lir1 is emitted as the near-infrared light Lir2.

Even at the position Pb, the light distribution in the near-infrared light Lir2 is narrower than the light distribution in the white light Lw2. However, in the near-infrared light Lir2, the light beam diameter is expanded to be large. Therefore, the difference between the light distribution in the white light Lw2 and the light distribution in the near-infrared light Lir2 is small compared with that at the position Pa.

The white light Lw2 and the near-infrared light Lir2 are incident on the optical filter 97. The optical filter 97 has a darkening region 97a. The darkening region 97a has a characteristic of transmitting white light and darkening near-infrared light.

FIG. 14D illustrates darkening in the near-infrared light Lir2. In FIG. 14D, the section where darkening occurs is shaded.

The darkening region 97a is provided at the central portion of the optical filter 97. Thus, when the near-infrared light Lir2 is incident on the optical filter 97, darkening occurs in the near-infrared light Lir2 near the center.

FIG. 14E illustrates the light distribution characteristic of the white light Lw2 and the light distribution characteristic of near-infrared light Lir2'. The near-infrared light Lir2' is near-infrared light after being darkened.

By using the optical filter 97, it is possible to make the light distribution in the near-infrared light Lir2' substantially similar to the light distribution in the white light Lw2. Thus, by increasing the light intensity of the near-infrared light Lir2', it is possible to match the light distribution in the near-infrared light Lir2' with the light distribution in the white light Lw2.

FIG. 14F illustrates the light distribution characteristic of the white light Lw2 and the light distribution characteristic of near-infrared light Lir3. The near-infrared light Lir3 is near-infrared light after increasing the light intensity.

As illustrated in FIG. 14F, the light distribution in the near-infrared light Lir3 substantially matches the light distribution in the white light Lw2. Thus, white light and near-infrared light are emitted from the illumination lens 98 in a state in which the light distributions are substantially matched. As a result, it is possible to make the brightness at the periphery of the field of view substantially equal in both near-infrared light observation and normal light observation.

In the foregoing description, for ease of understanding, the light intensity at the center of the white light Lw0 and the light intensity at the center of the near-infrared light Lir0 are the same, as illustrated in FIG. 14A. However, the light intensity of the near-infrared light is increased after being darkened by the darkening region 97a. Thus, it is desirable that the light intensity at the center of the near-infrared light Lir0 is made larger than the light intensity at the center of the white light Lw0 in advance.

It is possible to provide the darkening region 97a on the emission surface 96b or the lens surface of the illumination lens 98.

Figure 15A:
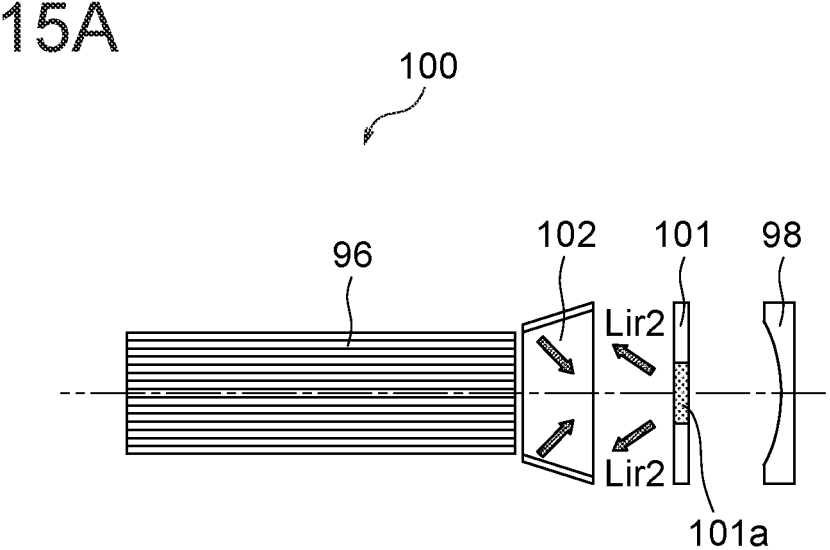
FIG. 15A, FIG. 15B and FIG. 15C are diagrams illustrating an illumination apparatus and an optical element.
Figure 15B:
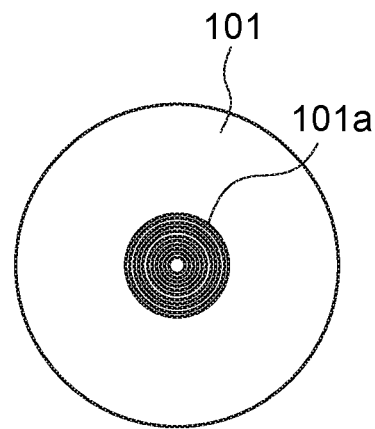
Figure 15C:
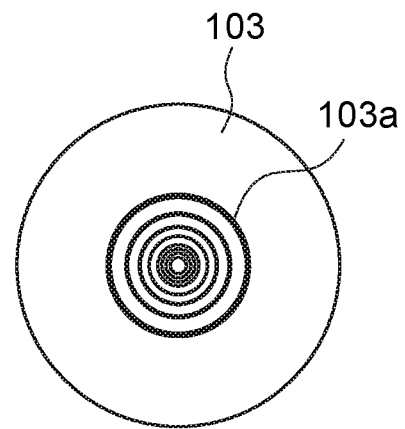

FIG. 15A to FIG. 15C are diagrams illustrating an illumination apparatus and an optical element. FIG. 15A is a diagram illustrating the illumination apparatus. FIG. 15B and FIG. 15C are diagrams illustrating the optical element. In FIG. 15A, the light sources and the like are not illustrated.

An illumination apparatus 100 includes an optical element 101 and a conical mirror 102. The optical element 101 includes a reflective diffraction grating 101a. The diffraction grating 101a has a characteristic of transmitting white light and reflecting near-infrared light.

The diffraction grating 101a is provided at the central portion of the optical element 101. Thus, when near-infrared light Lir2 is incident on the optical element 101, the near-infrared light Lir2 near the center is reflected toward the conical mirror 102. As a result, darkening occurs in the near-infrared light Lir2 near the center.

Thus, white light and near-infrared light are emitted from the illumination lens 98 in a state in which the light distributions are substantially matched. As a result, it is possible to make the brightness at the periphery of the field of view substantially equal in both near-infrared light observation and normal light observation.

As illustrated in FIG. 15B, the diffraction grating 101a has a plurality of rings. The distance between rings gradually increases from the center toward the periphery. Thus, in the diffraction grating 101a, the near-infrared light Lir2 is reflected so as to diverge.

The near-infrared light Lir2 is incident on the conical mirror 102. The near-infrared light Lir2 is reflected by a reflective surface of the conical mirror 102. Part of the near-infrared light Lir2 is emitted from the conical mirror 102 and again incident on the optical element 101.

The near-infrared light Lir2 incident on the optical element 101 is incident in a range wider than the diffraction grating 101a. Therefore, part of the near-infrared light Lir2 is transmitted through the optical element 101.

The light transmitted through the optical element 101 includes light reaching the periphery of the field of view. Since the near-infrared light near the center reaches the periphery of the field of view, it is possible to enhance the brightness at the periphery of the field of view.

In the diffraction grating, it is possible to change the direction of light reflection by changing the distance between rings. As a result, it is possible to change the light distribution of the near-infrared light.

FIG. 15C is a diagram illustrating another optical element. An optical element 103 includes a reflective diffraction grating 103a. The diffraction grating 103a has a characteristic of transmitting white light and reflecting near-infrared light.

The diffraction grating 103a is provided at the central portion of the optical element 103. Thus, when near-infrared light is incident on the optical element 103, the near-infrared light near the center is reflected. As a result, darkening occurs in the near-infrared light near the center.

The diffraction grating 103a has a plurality of rings. The distance between rings gradually increases from the center toward the periphery. Thus, in the diffraction grating 103a, the near-infrared light is reflected so as to diverge.

However, the distance between rings in the diffraction grating 103a is larger than the distance between rings in the diffraction grating 101a. In this case, the reflection angle of near-infrared light differs between the diffraction grating 103a and the diffraction grating 101a. Thus, in the optical element 103, it is possible to obtain a light distribution characteristic different from that of the optical element 101.

The present disclosure is suitable for an objective optical system in which the brightness in a near-infrared light image is sufficient, the color reproducibility in a white light image is high, and the displacement between the position of the near-infrared light image and the position of the white light image is small. Furthermore, the present disclosure is suitable for an image pickup apparatus and an endoscope in which it is possible to obtain a bright near-infrared light image and a white light image with high color reproducibility and to acquire a near-infrared light image and a white light image that are both sharp.

The present disclosure provides an objective optical system in which the brightness in a near-infrared light image is sufficient, the color reproducibility in a white light image is high, and the displacement between the position of the near-infrared light image and the position of the white light image is small. Furthermore, the present disclosure provides an image pickup apparatus and an endoscope in which it is possible to obtain a bright near-infrared light image and a white light image with high color reproducibility and to acquire a near-infrared light image and a white light image that are both sharp.

What is claimed is:

1. An endoscope comprising a predetermined lens disposed near a pupil of an objective optical system, wherein:
the predetermined lens has a first refractive region including an optical axis and a second refractive region located outside the first refractive region,
a refractive power of the second refractive region is greater than a refractive power of the first refractive region,
a light beam reaching an image plane includes a first light beam and a second light beam,
the first light beam is a light beam transmitted through the first refractive region and includes at least one of a beam of white light and a beam of near-infrared light,
the second light beam is a light beam transmitted through the second refractive region and includes only the beam of near-infrared light, and
the following Conditional Expression (1) is satisfied:

$$0 < \{(Dir/Dw)^2 \times (Tir/Dir)\} / \{(fir-fe)/(Pich \times Fno)\} < 0.1 \quad (1)$$

where;
Dir is an aperture diameter that allows the near-infrared light to pass through,
Dw is an aperture diameter that allows the white light to pass through,
Tir is a spherical segment amount in the second refractive region,
fir is a focal length of the objective optical system at a predetermined wavelength,
fe is a focal length of the objective optical system at e-line,
Fno is an F-number of the objective optical system at e-line, Pich is a pixel pitch of an imager, the spherical segment amount is a maximum distance among distances between a virtual plane and the second refractive region, the virtual plane is a plane passing through a boundary between the first refractive region and the second refractive region on a lens surface of the lens, and is orthogonal to the optical axis, the maximum distance is a distance in a direction parallel to the optical axis, and the predetermined wavelength is 835 nm.

2. The endoscope according to claim 1, wherein a paraxial radius of curvature at the lens surface in the second refractive region is smaller than a paraxial radius of curvature at the lens surface in the first refractive region.

3. The endoscope according to claim 1, wherein:

the first refractive region has an optical film provided on the lens surface, and the optical film has a characteristic of transmitting the white light and the near-infrared light.

4. The endoscope according to claim 1, wherein:

the second refractive region has an optical film provided on the lens surface, and the optical film has a characteristic of transmitting only the near-infrared light.

5. The endoscope according to claim 1, wherein:

a flat plate is disposed near the predetermined lens, the flat plate has a first transmission region and a second transmission region, the second transmission region has a characteristic of transmitting only the near-infrared light, the first light beam includes light transmitted through the first transmission region, and the second light beam includes light transmitted through the second transmission region.

* * * * *